US011750741B2

(12) United States Patent
Karp et al.

(10) Patent No.: US 11,750,741 B2
(45) Date of Patent: *Sep. 5, 2023

(54) SYSTEMS FOR TRANSITIONING TELEPHONY-BASED AND IN-PERSON SERVICING INTERACTIONS TO AND FROM AN ARTIFICIAL INTELLIGENCE (AI) CHAT SESSION

(71) Applicant: Capital One Services, LLC, McLean, VA (US)

(72) Inventors: Scott Karp, McLean, VA (US); Deepak Kaushik, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/340,348

(22) Filed: Jun. 7, 2021

(65) Prior Publication Data

US 2021/0297531 A1    Sep. 23, 2021

Related U.S. Application Data

(63) Continuation of application No. 16/828,996, filed on Mar. 25, 2020, now Pat. No. 11,032,421, which is a
(Continued)

(51) Int. Cl.
*H04M 3/51* (2006.01)
*G06F 9/54* (2006.01)
(Continued)

(52) U.S. Cl.
CPC .......... *H04M 3/5166* (2013.01); *G06F 9/547* (2013.01); *H04L 51/02* (2013.01); *H04M 3/5183* (2013.01);
(Continued)

(58) Field of Classification Search
CPC ............ H04M 3/5166; H04M 3/5183; H04M 3/5235; H04M 3/58; G06F 9/547; H04L 51/02
(Continued)

(56) References Cited

U.S. PATENT DOCUMENTS 8,942,369 B2    1/2015  Tuchman et al.
9,876,909 B1    1/2018  Klein et al.
(Continued)

FOREIGN PATENT DOCUMENTS

WO    20170192684 A1    11/2017

OTHER PUBLICATIONS

Combined Search and Examination Report in related GB Application No. GB2117037.8, dated May 26, 2022.
(Continued)

*Primary Examiner* — Thjuan K Addy
(74) *Attorney, Agent, or Firm* — TROUTMAN PEPPER HAMILTON SANDERS LLP; Christopher J. Forstner; John A. Morrissett

(57) ABSTRACT

A system for transitioning a telephony or in-person servicing to an artificial intelligence (AI) chat session. The system may receive a phone call from a user device associated with a user, and transmit a voice request for personally identifiable information associated with the user. The system may also receive and authenticate the requested personally identifiable information and, in response, generate an authentication token. The system may further receive a servicing intent from the user device, and generate a corresponding servicing intent token. Also, the system may generate an API call to an AI chatbot model, transmit the authentication token and the servicing intent token to the AI chatbot model, and map the servicing intent token to a stored servicing
(Continued)

intent. Finally, the system may transmit a message to the user device via the AI chat session.

20 Claims, 13 Drawing Sheets

Related U.S. Application Data continuation of application No. 16/419,964, filed on May 22, 2019, now Pat. No. 10,630,840.

(51) Int. Cl.
    *H04L 51/02*     (2022.01)
    *H04M 3/523*     (2006.01)
    *H04W 4/16*     (2009.01)
    *H04M 3/58*     (2006.01)
    *H04W 4/14*     (2009.01)

(52) U.S. Cl.
    CPC ............ *H04M 3/5235* (2013.01); *H04M 3/58* (2013.01); *H04W 4/14* (2013.01); *H04W 4/16* (2013.01)

(58) Field of Classification Search
    USPC ............ 379/265.02, 265.01, 265.06, 265.08, 379/265.11, 265.13, 266.01, 265.07
    See application file for complete search history.

(56) References Cited

U.S. PATENT DOCUMENTS

| | | |
|---|---|---|
| 10,044,647 B1 | 8/2018 | Karp et al. |
| 10,122,857 B2 | 11/2018 | Klein et al. |
| 10,148,601 B1 | 12/2018 | Dodelin et al. |
| 10,367,942 B2 | 7/2019 | Klein et al. |
| 10,810,574 B1 * | 10/2020 | Wilson ................. G06Q 20/389 |
| 10,841,258 B1 * | 11/2020 | Morris .................... H04L 51/08 |
| 2007/0265873 A1 | 11/2007 | Sheth et al. |
| 2009/0048845 A1 | 12/2009 | Burckart et al. |
| 2013/0198296 A1 | 8/2013 | Roy et al. |
| 2016/0371703 A1 | 12/2016 | Monegan et al. |
| 2017/0262891 A1 | 9/2017 | Green et al. |
| 2017/0324867 A1 | 11/2017 | Tamblyn et al. |
| 2018/0007102 A1 | 1/2018 | Klein et al. |
| 2018/0007204 A1 | 1/2018 | Klein et al. |
| 2018/0007205 A1 | 1/2018 | Klein et al. |
| 2018/0007206 A1 | 1/2018 | Klein et al. |
| 2018/0124245 A1 | 5/2018 | Klein et al. |
| 2018/0131808 A1 | 5/2018 | Klein et al. |
| 2018/0131810 A1 | 5/2018 | Yokel |
| 2019/0037076 A1 | 1/2019 | Klein et al. |

OTHER PUBLICATIONS

Examination Report in related GB Application No. GB2007659.2, dated Mar. 10, 2023.
Examination Report in related GB Application No. GB2117159.0, dated Mar. 9, 2023.

\* cited by examiner

SYSTEMS FOR TRANSITIONING TELEPHONY-BASED AND IN-PERSON SERVICING INTERACTIONS TO AND FROM AN ARTIFICIAL INTELLIGENCE (AI) CHAT SESSION

CROSS REFERENCE TO RELATED APPLICATIONS

This application is a continuation of, and claims priority under 35 U.S.C. § 120 to, U.S. patent application Ser. No. 16/828,996, filed Mar. 25, 2020, which is a continuation of U.S. patent application Ser. No. 16/419,964, now U.S. Pat. No. 10,630,840, filed May 22, 2019, the entire contents of which are fully incorporated herein by reference.

FIELD OF INVENTION

The present disclosure generally relates to systems for transitioning between various types of communication mediums during a customer service interaction and, more particularly, systems for seamlessly transitioning a telephony-based and in-person servicing interactions to and (sometimes from) an AI chat session (e.g., one or more of an short messaging service (SMS) text-based AI chat session, a mobile application text-based AI chat session, an email-based AI chat session, and a web browser-based AI chat session, etc.).

BACKGROUND

Organizations that offer products and/or services associated with customer accounts have traditionally relied on in-person servicing at a brick-and-mortar location, call centers, IVR systems to interact with customers for account servicing.

In person servicing at a brick-and-mortar location and call centers staffed with human representatives can provide certain advantages, particularly for customers who wish to speak to a human. However, such staffing can be cost-prohibitive on the organization (and, in turn, the customers) and often results in long wait times for customers.

To reduce cost and increase account servicing efficiency, many organizations employ IVR systems. Such systems can provide customers with requested information and perform routine account actions without having to maintain a large workforce of human customer service agents. While cost effective, existing computerized customer interaction systems tend to provide an impersonal and robotic user experience, limited by scripted questions and responses, and can require a cumbersome authorization process for each customer-service session.

Regardless of whether an organization employs in-person servicing, call centers, or IVR systems, these approaches utilize voice-based communication that can often be disadvantageous for the customer. Spoken information can be easily misunderstood, difficult to follow or remember, difficult to hear (e.g., due to hearing impairments or background noise), and does not have a persistent record for the customer. In addition, a customer may be in an environment or situation (e.g., in a public place or in a meeting) where it would be inconvenient or impractical to converse with an IVR model or a human representative in voice-based communication over the phone.

As an alternative to voice-based communication systems, some organizations have turned to text-based communication to interact with customers via their mobile phones. Text-based communication systems makes it easy and efficient to store a record of an entire customer service interaction and can convey detailed information to a customer that is easier to receive visually than by voice (e.g., a long account number, a recent transaction history, balances in multiple accounts, etc.). Text-based communication systems are typically less likely to be misunderstood and easy to remember because they provide a persistent record for the customer. However, text-based communication systems have more difficulty addressing certain types of customer requests than voice-based communication system due to the nature of those requests and information in the related responses. Additionally, customers are typically at the mercy of which type of communication system that the organization has chosen to employ, and cannot select a communication medium that is more convenient for himself or herself. Even for organizations that provide multiple types of communication mediums (e.g., a call center, an in-person brick-and-mortar location, and a text-based communication system) to their customers, such comprehensive "systems" operate as separate systems that cannot seamlessly transition a customer between communication mediums. For example, a customer who texts into a text-based communication system may have to authenticate himself and submit his request only to find out that he must submit that type of request to the organization's IVR system, requiring the customer to call the IVR system and both authenticate himself and submit his request to that particular system. This inability to transition a customer service interaction between communication mediums is not only time-consuming and irritating for the customer, but inefficiently overuses the organization's resources as the text-based communication and IVR systems pass customer service interactions between one another and repeat completed steps.

Accordingly, there is a need for improved systems to provide efficient and cost-effective customer interaction systems for account servicing. Embodiments of the present disclosure are directed to this and other considerations.

SUMMARY

Disclosed embodiments provide systems for transitioning a telephony call (e.g., an IVR call or a customer agent phone call) or an in-person servicing interaction to and (sometimes from) an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session, etc.). In an embodiment, a system is provided that includes one or more processors and a memory in communication with the one or more processors and storing instructions that, when executed by the one or more processors, are configured to cause the system to perform one or more steps. Specifically, the system may receive a phone call from a user device (e.g., a cell phone or smart device with voice capability) associated with a user. In response, the system may optionally (e.g., if an IVR model) transmit a voice request for personally identifiable information associated with the user over the phone call. When the user responds to the voice request, the system in turn receives the personally identifiable information and can authenticate the personally identifiable information. In response, the system may then generate an authentication token. The system may also receive a servicing intent from the user device and generate a servicing intent token based on the servicing intent. The system may then generate an application programming interface (API) call to an AI chatbot model, transmit the authentication token and the servicing intent token to the AI chatbot model, and map the servicing intent token to a plurality of servicing intents stored by the AI chatbot model. Finally, system may transmit a message (e.g., to the user device via an AI chat session. Optionally, (e.g., if previously using an IVR model) then system may transmit to the user via the phone call, a voice message indicating that the AI chat session is available.

In another embodiment, a system is provided that includes one or more processors and a memory in communication with the one or more processors and storing instructions that, when executed by the one or more processors, are configured to cause the system to perform one or more steps. Specifically, the system may receive a phone call from a user device (e.g., a cell phone or smart device with voice capability) associated with a user and, during the call, receive one or more user utterances. In response, the system may transcribe the one or more user utterances, generate an application programming interface (API) call to an AI chatbot model, and transmit the transcribed one or more user utterances to the AI chatbot model. The system may map the transcribed one or more user utterances to one or more stored servicing intent tokens from a plurality of stored servicing intent tokens, and transmitting a message to the user device via an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, or a vehicle entertainment system application voice-based AI chat session).

In another embodiment, a system is provided that includes one or more processors and a memory in communication with the one or more processors and storing instructions that, when executed by the one or more processors, are configured to cause the system to perform one or more steps. Specifically, the system may receive, by an IVR model and from a user device associated with a user and a phone number, a first phone call. The system may receive, from the user device via the first phone call, a touch tone phone input or a user utterance and determine that the touch tone phone input or the user utterance corresponds to a first servicing intent. The system may then generate a first servicing intent token based on the first servicing intent, generate a call to an AI chatbot model via an application programming interface (API), and transmit the first servicing intent token to the AI chatbot model. The system may also map the first servicing intent token to a plurality of servicing intents stored by the AI chatbot model, and initiate an AI chat session with the user device by transmitting a short message service (SMS) message, a mobile application notification, an email message, or combinations thereof to the user device. The system may then transmit, to the user device via the AI chat session, a first answer responding to the first servicing intent. During the AI chat session, the system may receive a first user message comprising a second servicing intent and a second user message comprising a request to be transferred to the IVR model. In response, the system may transmit the first user message to the IVR model and determine whether the first phone call is active. When the first phone call is active, the system may transmit a system message that the IVR model is available to the user device via the AI chat session. Alternatively, when the phone call is not active, the system may initiate, via the IVR model, a second phone call with the first user device by calling the phone number. The system may transmit, via the first phone call or the second phone call, a second answer responding to the second servicing intent.

In another embodiment, a system is provided that includes one or more processors and a memory in communication with the one or more processors and storing instructions that, when executed by the one or more processors, are configured to cause the system to perform one or more steps. Specifically, the system may receive authentication input data. In response, the system may then generate an authentication token based on the authentication input data. The system may also receive a servicing intent input data and generate a servicing intent token based on the servicing intent input data. The system may then generate an application programming interface (API) call to an AI chatbot model, transmit the authentication token and the servicing intent token to the AI chatbot model, and map the servicing intent token to a plurality of servicing intents stored by the AI chatbot model. Finally, the system may transmit a message to the user device via an AI chat session (e.g., one or more of a short messaging service (SMS) text-based AI chat session, a mobile application text-based AI chat session, an email-based AI chat session, and web browser-based AI chat session, voice-based AI chat session (e.g., a phone call AI chat session, a mobile application voice-based AI chat session, a smart speaker application voice-based AI chat session, or a vehicle entertainment system application voice-based AI chat session), etc.).

In another embodiment, a system is provided that includes one or more processors and a memory in communication with the one or more processors and storing instructions that, when executed by the one or more processors, are configured to cause the system to perform one or more steps. Specifically, the system may receive personally identifiable information from a user interaction device (e.g., a customer interaction device) and authenticate the personally identifiable information. In response, the system may then generate an authentication token. The system may also receive a servicing intent from the user interaction device and generate a servicing intent token based on the servicing intent. The system may then generate an application programming interface (API) call to an AI chatbot model, transmit the authentication token and the servicing intent token to the AI chatbot model, and map the servicing intent token to a plurality of servicing intents stored by the AI chatbot model. Finally, the system may transmit a message to the user device via an AI chat session (e.g., one or more of a short messaging service (SMS) text-based AI chat session, a mobile application text-based AI chat session, an email-based AI chat session, and web browser-based AI chat session, voice-based AI chat session (a mobile application voice-based AI chat session, a smart speaker application voice-based AI chat session, or a vehicle entertainment system application voice-based AI chat session), etc.).

In another embodiment, a system is provided that includes one or more processors and a memory in communication with the one or more processors and storing instructions that, when executed by the one or more processors, are configured to cause the system to perform one or more steps. Specifically, the system may receive a servicing intent from a user device and generate a servicing intent token based on the servicing intent. The system may then generate an application programming interface (API) call to an AI chatbot model, transmit the servicing intent token to the AI chatbot model, and map the servicing intent token to a plurality of servicing intents stored by the AI chatbot model. The system may transmit a message to the user device via an AI chat session (e.g., one or more of a short messaging service (SMS) text-based AI chat session, a mobile application text-based AI chat session, an email-based AI chat session, and web browser-based AI chat session, voice-based AI chat session, etc.). The system may transmit a request for personally identifiable information associated with the user from the user device via the AI chat session. The system may receive the personally identifiable information via the AI chat session and can authenticate the personally identifiable information. Finally, the system may transmit to the user device an answer via the AI chat session (e.g., one or more of a short messaging service (SMS) text-based AI chat session, a mobile application text-based AI chat session, an email-based AI chat session, and web browser-based AI chat session, voice-based AI chat session (e.g., a phone call AI chat session, a mobile application voice-based AI chat session, a smart speaker application voice-based AI chat session, or a vehicle entertainment system application voice-based AI chat session), etc.).

In another embodiment, a system is provided that includes one or more processors and a memory in communication with the one or more processors and storing instructions that, when executed by the one or more processors, are configured to cause the system to perform one or more steps. Specifically, the system may receive one or more user utterances via a phone call from a user device (e.g., a cell phone or smart device with voice capability) or from a voice recording. In response, the system may generate an application programming interface (API) call to an AI chatbot model and transmit the one or more user utterances to an AI chatbot model. The system may, via the AI chatbot model, transcribe the one or more user utterances. The system may map the transcribed one or more user utterances to one or more stored servicing intent tokens from a plurality of stored servicing intent tokens. The system may determine whether an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, or a vehicle entertainment system application voice-based AI chat session) is available for the servicing intent. The system may request a new servicing intent when the system determines that the AI chat session is not available for the servicing intent. However, when the system determines that the AI chat session is available for the servicing intent, the system may select a messaging channel based on explicit user preference, implicit user preference, type of information system is providing (e.g., optimal channel to handle the specific intent), a machine learning model that predicts the best messaging channel for the user, or combinations thereof. Then the system may trigger an AI chat session and transmit a message to the user device, a message via the selected messaging channel.

In yet another embodiment, a system is provided that includes one or more processors and a memory in communication with the one or more processors and storing instructions that, when executed by the one or more processors, are configured to cause the system to perform one or more steps. Specifically, the system may receive one or more user utterances via a first phone call from a user device (e.g., a cell phone or smart device with voice capability). In response, the system may generate an application programming interface (API) call to an AI chatbot model and transmit the one or more user utterances to an AI chatbot model. The system may, via the AI chatbot model, transcribe the one or more user utterances. The system may map the transcribed one or more user utterances to one or more servicing intent tokens from a plurality of stored servicing intent tokens. The system may optionally, via a voice-based AI chat session (e.g., a phone call AI chat session, a mobile application voice-based AI chat session, a smart speaker application voice-based AI chat session, or a vehicle entertainment system application voice-based AI chat session), call the user device via a second phone call. Finally, the system may provide an answer to the servicing intent token via the first phone call or the second phone call.

Further features of the disclosed design, and the advantages offered thereby, are explained in greater detail hereinafter with reference to specific embodiments illustrated in the accompanying drawings, wherein like elements are indicated with like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology.

DETAILED DESCRIPTION

Figure 1:
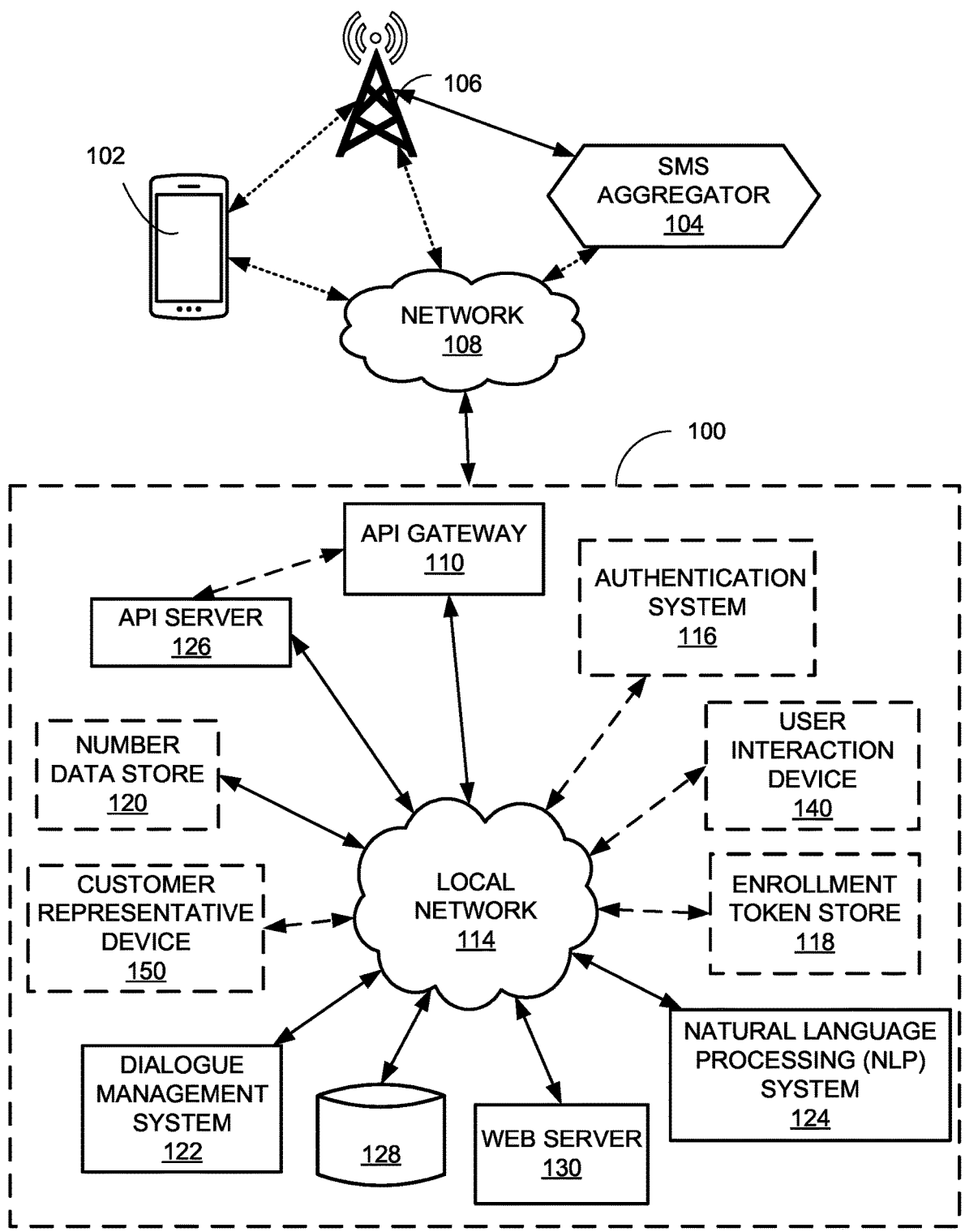
FIG. 1 is an example block diagram representing a system 100 that may be used for transitioning an IVR call to an AI chat session.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed technology and embodiments include systems for transitioning an telephony (e.g., a customer service agent call or an IVR call) to an AI chat session (e.g., an short messaging service (SMS) AI chat session, a mobile application text-based AI chat session, email AI chat session, web-based AI chat session, a mobile application voice-based AI chat session, a smart speaker application voice-based AI chat session, a vehicle entertainment system application voice-based AI chat session, etc.,) and sometimes back to an telephony call (e.g., an IVR call) or another type of AI chat session. In a first aspect, a system is provided that includes one or more processors and a memory in communication with the one or more processors and storing instructions that, when executed by the one or more processors, are configured to cause the system to perform one or more steps. For example, the system may be configured to receive, from a user device associated with a user, a phone call. The system may also transmit, to the user device via the phone call, a voice request for personally identifiable information associated with the user. The system may receive, from the user device via the phone call, the personally identifiable information and authenticate the personally identifiable information. In response, the system may generate an authentication token. The system may also receive, from the user device, a servicing intent and generate a servicing intent token based on the servicing intent. The system may generate an application programming interface (API) call to an AI chatbot model, transmit the authentication token and the servicing intent token to the AI chatbot model, and map the servicing intent token to a plurality of servicing intents stored by the AI chatbot model. The system may also transmit a message to the user device via an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, or a vehicle entertainment system application voice-based AI chat session).

In certain example implementations, the message is communicated via one or more messaging channels comprising a short message service (SMS) message channel, a mobile application notification channel, and an email message channel.

In certain example implementations, the system may be further configured to select the one or more messaging channels based on one or more rules, predictive machine learning, or combinations thereof; and transmit, to the user device via the phone call, a voice message indicating that the AI chat session is available.

In certain example implementations, selecting the one or more messaging channels is based on predictive machine learning for determining one or more implicit preference of the user based on a history of interactions with the user.

In certain example implementations, selecting the one or more messaging channels is based on one or more rules including determining whether the user device has a corresponding mobile application installed, selecting the mobile application notification channel responsive to determining that the user device does have the corresponding mobile application installed, selecting the email message channel responsive to determining that the corresponding mobile application is not installed and a user's email is the only contact information on record, and selecting the SMS message channel responsive to determining that the corresponding mobile application is not installed and a phone number is on record. In alternative embodiments, selecting the one or more messaging channels includes selecting the SMS message channel when a mobile phone number is on record even if the mobile application is installed because the user has an implicit or explicit preference for SMS messaging.

In certain example implementations, the system may be further configured to receive a messaging channel selection from the user device, the messaging channel selection indicative of the user's preference for one or more messaging channels of the SMS message channel, the mobile application notification channel, and the email message channel.

In certain example implementations, the system may be further configured to transmit, via the AI chat session, an answer to the user device based on the servicing intent, and store text-based interaction comprising the answer.

In certain example implementations, the system may be further configured to, responsive to receiving the authentication token, transmit an indication, via the AI chat session, that the user device has been previously authenticated.

In certain example implementations, the servicing intent comprises a request for an account balance, a request for recent transactions, a request to update an email address of the user, a request for a bank card, a request for why a recent transaction was declined, or combinations thereof. The answer comprises an account balance of the user, recent transactions of the user, a prompt to the user to type an email address of the user in the AI chat session, a confirmation that a bank card will be mailed, an explanation on why the recent transaction was declined, or combinations thereof.

In certain example implementations, the answer comprises a deep link that allows the user device to perform an action in a mobile application or a web browser based on the servicing intent and without additional authentication.

In certain example implementations, receiving, from the user device, the servicing intent comprises (i) receiving an option selected from a touch tone menu or (ii) receiving a user utterance corresponding to the servicing intent and determining the servicing intent from the user utterance.

In another aspect, a system is provided that includes one or more processors and a memory in communication with the one or more processors and storing instructions that, when executed by the one or more processors, are configured to cause the system to perform one or more steps recited herein. For example, the system may be configured to receive, from a user device associated with a user, a phone call. The system may also receive, from the user device via the phone call, one or more user utterances and transcribe the one or more user utterances. The system may generate an application programming interface (API) call to an AI chatbot model, transmit the transcribed one or more user utterances to the AI chatbot model, and convert the transcribed one or more user utterances to a servicing intent recognizable by the AI chatbot model. The system may further initiate an AI chat session with the user device by transmitting a message to the user device via the AI chat session.

In certain example implementations, the message is communicated via one or more messaging channels comprising a short message service (SMS) message channel, a mobile application notification channel, and an email message channel.

In certain example implementations, the system may be further configured to select the one or more messaging channels based on one or more rules, predictive machine learning, or combinations thereof. The system may be further configured to transmit, to the user device via the phone call, a voice message indicating that the AI chat session is available.

In certain example implementations, selecting the one or more messaging channels is based on predictive machine learning for determining one or more implicit preferences of the user based on a history of interactions with the user.

In certain example implementations, selecting the one or more messaging channels is based on one or more rules comprising determining whether the user device has a corresponding mobile application installed, selecting the mobile application notification channel responsive to determining that the user device does have the corresponding mobile application installed, and selecting the email message channel responsive to determining that the corresponding mobile application is not installed and a user's email is the only contact information on record, and selecting the SMS message channel responsive to determining that the corresponding mobile application is not installed and a phone number is on record.

In certain example implementations, the system may receive a messaging channel selection from the user device, the messaging channel selection indicative of the user's preference for one or more messaging channels of the SMS message channel, the mobile application notification channel, and the email message channel.

In certain example implementations, the system may be further configured to transmit, via the AI chat session, an answer to the user device based on the servicing intent.

In certain example implementations, the system may be further configured to store text-based interaction comprising the answer.

In yet another aspect, a system is provided that includes one or more processors and a memory in communication with the one or more processors and storing instructions that, when executed by the one or more processors, are configured to cause the system to perform one or more steps recited herein. For example, the system may receive, by an IVR model and from a user device associated with a user and a phone number, a first phone call. The system may also receive, from the user device via the first phone call, a touch tone phone input or a user utterance and determine that the touch tone phone input or the user utterance corresponds to a first servicing intent. The system may generate a first servicing intent token based on the first servicing intent. The system may also generate, via an application programming interface (API), a call to an AI chatbot model. The system may then transmit, to the AI chatbot model, and the first servicing intent token, and map the first servicing intent token to a plurality of servicing intents stored by the AI chatbot model. The system may initiate an AI chat session with the user device by transmitting a short message service (SMS) message, a mobile application notification, an email message, or combinations thereof to the user device. The system may transmit, to the user device via the AI chat session, a first answer responding to the first servicing intent and receive, from the user device via the AI chat session, a first user message comprising a second servicing intent and a second user message comprising a request to be transferred to the IVR model. The system may then transmit, to the IVR model, the first user message and determine whether the first phone call is active. Responsive to determining that the first phone call is active, the system may transmit, to the user device via the AI chat session, a system message that the IVR model is available. Responsive to determining that the phone call is not active, the system may initiate, via the IVR model, a second phone call with the first user device by calling the phone number. The system a may also transmit, via the first phone call or the second phone call, a second answer responding to the second servicing intent.

In an aspect, a system is provided that includes one or more processors and a memory in communication with the one or more processors and storing instructions that, when executed by the one or more processors, are configured to cause the system to receive authentication input data. In response, the system may then generate an authentication token based on the authentication input data. The system may also receive a servicing intent input data and generate a servicing intent token based on the servicing intent input data. The system may then generate an application programming interface (API) call to an AI chatbot model, transmit the authentication token and the servicing intent token to the AI chatbot model, and map the servicing intent token to a plurality of servicing intents stored by the AI chatbot model. Finally, the system may transmit a message to the user device via an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session, etc.).

In another aspect, a system is provided that includes one or more processors and a memory in communication with the one or more processors and storing instructions that, when executed by the one or more processors, are configured to cause the system to receive personally identifiable information from a user interaction device (e.g., a customer interaction device) and authenticate the personally identifiable information. In response, the system may then generate an authentication token. The system may also receive a servicing intent from the user interaction device and generate a servicing intent token based on the servicing intent. The system may then generate an application programming interface (API) call to an AI chatbot model, transmit the authentication token and the servicing intent token to the AI chatbot model, and map the servicing intent token to a plurality of servicing intents stored by the AI chatbot model. Finally, the system may transmit a message to the user device via an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session, etc.).

In another aspect, a system is provided that includes one or more processors and a memory in communication with the one or more processors and storing instructions that, when executed by the one or more processors, are configured to cause the system to receive a servicing intent from a user device and generate a servicing intent token based on the servicing intent. The system may then generate an application programming interface (API) call to an AI chatbot model, transmit the servicing intent token to the AI chatbot model, and map the servicing intent token to a plurality of servicing intents stored by the AI chatbot model. The system may transmit a message to the user device via an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session, etc.). The system may transmit a request for personally identifiable information associated with the user from the user device via the AI chat session. The system may receive the personally identifiable information via the AI chat session and can authenticate the personally identifiable information. Finally, the system may transmit to the user device an answer via the AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session, etc.).

In another aspect, a system is provided that includes one or more processors and a memory in communication with the one or more processors and storing instructions that, when executed by the one or more processors, are configured to cause the system to perform one or more steps. For example, the system may receive one or more user utterances via a phone call from a user device (e.g., a cell phone or smart device with voice capability) or from a voice recording. In response, the system may generate an application programming interface (API) call to an AI chatbot model and transmit the one or more user utterances to an AI chatbot model. The system may, via the AI chatbot model, transcribe the one or more user utterances. The system may map the transcribed one or more user utterances to one or more servicing intent tokens from a plurality of stored servicing intent tokens. The system may determine whether an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session, etc.) is available for the servicing intent. The system may request a new servicing intent when the system determines that the AI chat session is not available for the servicing intent. However, when the system determines that the AI chat session is available for the servicing intent, the system may select a messaging channel based on explicit user preference, implicit user preference, type of information system is providing (e.g., a optimal channel/medium to handle a specific intent token), machine learning predictions, or combinations thereof. Then the system may trigger an AI chat session and transmit a message to the user device, a message via the selected messaging channel.

In yet another aspect, a system is provided that includes one or more processors and a memory in communication with the one or more processors and storing instructions that, when executed by the one or more processors, are configured to cause the system to perform one or more steps. For example, the system may receive one or more user utterances via a first phone call from a user device (e.g., a cell phone or smart device with voice capability). In response, the system may generate an application programming interface (API) call to an AI chatbot model and transmit the one or more user utterances to an AI chatbot model. The system may, via the AI chatbot model, transcribe the one or more user utterances. The system may map the transcribed one or more user utterances to one or more servicing stored intent tokens of a plurality of stored servicing intents. The system may optionally, via a voice-based AI chat session (e.g., a phone call AI chat session, a mobile application voice-based AI chat session, a smart speaker application voice-based AI chat session, a vehicle entertainment system application voice-based AI chat session, etc.), call the user device via a second phone call. Finally, the system may provide an answer to the servicing intent via the first phone call or the second phone call.

Reference will now be made in detail to example embodiments of the disclosed technology, examples of which are illustrated in the accompanying figures and disclosed herein. Wherever convenient, the same references numbers will be used throughout the drawings to refer to the same or like parts.

FIG. 1 is an example block diagram representing a system 100 that may be used for transitioning a telephony or in-person servicing to (and from) other types of communication mediums (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session etc.), according to an example implementation of the disclosed technology. System 100 may be provided or controlled by an organization including, as non-limiting examples, a financial service provider (e.g., a credit card company or a bank), a telecommunications company, an internet service provider company, a healthcare insurance company, a doctor's practice, and a customer service department acting on behalf of any company that provides a product or service that customers may inquire about. In certain example implementations, the system 100 may be configured to perform one or more of: authentication, transitioning a telephony (e.g., an IVR call or a customer agent call) or in-person servicing to an AI chat session, enrollment in SMS account servicing, token control, and account servicing. The system 100 utilizes automated natural language dialogue that may adaptively respond to customer messages (regardless of the communication medium in which they are received) based on an evolving customer context associated with a given customer. The components and arrangements shown in FIG. 1 are not intended to limit the disclosed embodiments as the components used to implement the disclosed processes and features may vary.

As shown in FIG. 1, the system 100 may be utilized to communicate with a user device 102 via various paths, such as through a SMS aggregator 104 (or gateway), which may serve as an intermediary between one or more mobile service providers 106 and the system 100. In certain example implementations, the SMS aggregator 104 and/or the user device 102 may be in communication with the system 100 via a network 108, including, but not limited to the Internet. Certain example implementations of the disclosed technology can include a local area network 114 for communication with the various modules of the system.

In certain example implementations, the system 100 can include an API gateway 110 to act as a "front door" for applications access data, logic, and/or functionality from the API server 126 and/or other back-end services. In certain example implementations, the API gateway 110 may be configured to handle tasks involved in accepting and processing concurrent API calls, including traffic management, authorization, access control, monitoring, API version management, etc.

In accordance with certain example implementations of the disclosed technology, the system 100 may be operated by an account provider and may include one or more of: an optional authentication system 116, an optional enrollment token store 118, an optional phone number data store 120, a dialogue management system 122, a natural language processing (NLP) system 124, database 128 (which may house one or more databases), one or more web servers 130, an optional user interaction device/customer interaction device 140, and an optional customer representative device 150. As shown, the various modules 110-150 may be in communication via the local network 114. In accordance with certain example implementations of the disclosed technology, the optional authentication module 116 may be utilized to receive a user's personally identifiable information (e.g., e.g., first name, last name, age, sex, birthday, phone number, user name, password, address, VIP status, key customer status, preferences, preferred language, vehicle(s) owned, greeting name, channel, talking points (e.g., favorite sports team), bank account number, mortgage loan account number, car loan account number, healthcare account number (e.g., healthcare insurance account number or a lab work account number) etc.). In certain example implementations, the optional authentication system 116 may extract and decode (or receive from user device 102) the (extracted/decoded) user's personally identifiable information and may access the optional phone number data store 120, the database 128, or customer information database 216 (FIG. 2) to determine if the extracted personally identifiable information matches with any of the personally identifiable information stored in the optional phone number data store 120, the database 128, or customer information database 216. If the personally identifiable information extracted, decoded, or received from user device 102 matches the personally identifiable information stored in optional phone number data store 120, the database 128, or customer information database 216, then authentication system 116 may generate an authentication token and may transfer that token to the dialogue management system 122 or allow the dialogue management system 122 access to the authentication token. In certain example implementations, the optional phone number data store 120, the database 128, and customer information database 216 may take the form of searchable databases and/or a look-up table that stores personally identifiable information for customers of the account provider. In one example implementation of the disclosed technology, the optional phone number data store 120 may store mobile phone numbers for authenticated, consenting customers who are currently enrolled in the account servicing via SMS messages. In certain example implementations, the optional phone number data store 120 may include fields with all known phone numbers of existing customers, and one or more fields associated with each phone number that may indicate a status of the phone number. In some embodiments, the optional authentication system 116 may read both fields and authenticate the sender's mobile phone number if there is a corresponding matching phone number in the optional phone number data store 120, and if the status field indicates that the number is associated with an authenticated and consenting customer. In accordance with certain example implementations of the disclosed technology, the optional enrollment token store 118 may take the form of a searchable database and/or a look-up table (similar to the optional phone number data store 120) that stores uniquely identifiable revocable tokens for customers of the account provider. In one example implementation of the disclosed technology, the optional enrollment token store 118 may store tokens for authenticated, consenting customers who are currently enrolled in the account servicing via SMS messages. In certain example implementations, the optional enrollment token store 118 may include fields with account identifiers for existing customers and/or one or more fields indicating a status of the associated revocable tokens (i.e., for authenticated and consenting customers, or otherwise). In certain example implementations, the optional authentication system 116 may read one or more fields in the optional enrollment token store 118 to determine the status of the associated revocable token. Additional descriptions of these and related processes involving the modules 110, 116, 118, 120, 122, 124, 126, and 128, will be explained further with reference to FIGS. 2 and 3.

In some embodiments, a customer or user may operate user device 102. User device 102 can include one or more of a mobile device, smart phone, general purpose computer, tablet computer, laptop computer, smart wearable device, voice command device, an Internet-of-Things device, a smart speaker, a vehicle entertainment (or infotainment) system, other mobile computing device, or any other device capable of communicating with the service provider 106 and/or the network 108, and ultimately communicating with one or more components of the system 100.

According to an example implementation of the disclosed technology, the user device 102 may belong to or be provided by a customer, or may be borrowed, rented, or shared. Customers may include individuals such as, for example, subscribers, clients, prospective clients, or customers of an entity associated with an organization, such as individuals who have obtained, will obtain, or may obtain a product, service, or consultation from an entity associated with the organization. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

According to an example implementation of the disclosed technology, the network 108 may be of any suitable type, including individual connections via the Internet such as cellular or WiFi™ networks. In some embodiments, network 108 may connect terminals, services, and mobile devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, WAN, or LAN. Bluetooth™ is a wireless technology standard for exchange data between mobile devices and fixes devices (e.g., a local area network access point) using short wavelength UHF radio waves in industrial scientific and medical (ISM) radio bands from 2.400 GHz to 2.485 GHz. Bluetooth™, divides transmitted data into packets and transmits each packet on one of 79 designated channels. Each channel has a bandwidth of 1 MHz. However, BLE uses 2 MHz bandwidth accommodating 40 channels. Wi-Fi™ is radio technology that is based around Institute of Electrical and Electronics Engineers (IEEE) 802.11 standards and is sued for wireless local area networking. The IEEE 802.11 standard provides for communication over 900 MHZ, 2.4 GHz, 5 GHz, 5.9 GHz, and 60 GHz bands, which each range subdivided into multiple channels. ZigBee™ is typically used for wireless personal area networks and is based on the IEEE 802.15.4 standard. ZigBee™ operates in the ISM radio bands of 2.4 GHz most places, 784 MHz in China, 868 MHz in Europe, and 915 MHz in USA and Australia.

Because the information transmitted may be personal or confidential, security concerns may dictate one or more of these types of connections be encrypted or otherwise secured. In some embodiments, however, the information being transmitted may be less personal, and therefore the network connections may be selected for convenience over security.

According to an example implementation of the disclosed technology, the network 108 may include any type of computer networking arrangement used to exchange data. For example, the network 108 may be the Internet, a private data network, virtual private network using a public network, and/or other suitable connection(s) that enables components in the system 100 to send and receive information between the components of the system 100. In certain example implementations, the network 108 may also include a public switched telephone network ("PSTN") and/or a wireless network.

In accordance with certain example implementations of the disclosed technology, the system 100 may be associated with and optionally controlled by an entity such as a business, corporation, individual, partnership, or any other entity that provides one or more of goods, services, and consultations to individuals such as customers. The system 100 can include or be in contact with one or more servers and computer systems for performing one or more functions associated with products and/or services that an organization provides. Such servers and computer systems may include, for example, web servers, call center servers, and/or transaction servers, as well as any other computer systems necessary to accomplish tasks associated with the organization and/or the needs of customers (which may be customers of the entity associated with the organization). In an example implementation, the system may include the web server(s) 130 configured to generate and provide one or more websites accessible to customers, as well as any other individuals involved in the organization normal operations.

According to an example implementation of the disclosed technology, the web server 130 may include a computer system configured to receive communications from the user device 102 via for example, a mobile application, a chat program, an instant messaging program, a voice-to-text program, an SMS message, email, or any other type or format of written or electronic communication. The web server 130 may include one or more processors and one or more web server databases, which may be any suitable repository of website data. Information stored in web server 130 may be accessed (e.g., retrieved, updated, and added to) via the local network 114 and/or the network 108 by one or more devices or systems (e.g., dialogue management system 122) of the system 100. In some embodiments, one or more processors may be used to implement an automated natural language dialogue system that may interact with a customer via different types of communication channels such as a website, mobile application, instant messaging application, SMS message, email, or any other type of electronic communication. In certain example implementations, when an incoming message is received from the user device 102, the web server 130 may be configured to determine the type of communication channel that the user device 102 used to generate the incoming message.

Certain example implementations of the system 100 may also include one or more call center servers (not shown) that may include a computer system configured to receive, process, and route telephone calls and other electronic communications between a customer operating user device 102 and the dialogue management system 122. Information stored in call center server, for example may be accessed (e.g., retrieved, updated, and added to) via local network 114 and/or the network 105 by one or more devices or systems (e.g., dialogue management system 122) of system 100. In some embodiments, one or more processors may be used to implement an interactive voice response (IVR) system that interacts with the customer over the phone.

Certain example implementations of the system 100 may also include one or more transaction servers (not shown) that may include a computer system configured to process one or more transactions involving an account associated with customers, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with the organization provides to individuals such as customers. The transaction server, for example, may have one or more processors and one or more transaction server databases, which may be any suitable repository of transaction data. Information stored in transaction server may be accessed (e.g., retrieved, updated, and added to) via local network 114 and/or network 108 by one or more devices or systems (e.g., dialogue management system 122) of system 100.

In some embodiments, a transaction server may track and store event data regarding interactions between a third party and the organization on behalf of the customer. For example, third party interactions may be tracked, which can include purchase requests, refund requests, warranty claims, account withdrawals and deposits, and any other type of interaction that a third-party server may conduct with the organization on behalf of an individual such as customer.

In accordance with certain example implementations of the disclosed technology, the local network 114 may include any type of computer networking arrangement used to exchange data in a localized area, such as WiFi™, Bluetooth™, Ethernet, and other suitable network connections that enable components of the organization to interact with one another and to connect to the network 108 for interacting with components of the system 100. In some embodiments, the local network 114 can include an interface for communicating with or linking to the network 108. In other embodiments, components of an organization may communicate via the network 108, without a separate local network 114.

In accordance with certain example implementations of the disclosed technology, and with continued reference to FIG. 1, the dialogue management system 122 can include one or more computer systems configured to compile data from a plurality of sources, such as the web server 130, a call center server, and/or a transaction server. In certain example implementations, the dialogue management system 122 may be utilized to correlate compiled data, analyze the compiled data, arrange the compiled data, generate derived data based on the compiled data, and store the compiled and derived data in a database such as database 128. According to some embodiments, database 128 may be associated with an organization and/or its related entity, and may store a variety of information relating to customers, transactions, and business operations. In certain example implementations, the database 128 may also serve as a back-up storage device. In certain example implementations, the database 128 may be accessed by dialogue management system 122 and may be used to store records of every interaction, communication, and/or transaction a particular customer has had with the system 100 and/or its related entity in the past, for example, to enable the creation of an ever-evolving customer context that may enable dialogue management system 122 to provide customized and adaptive dialogue when interacting with the customer.

In accordance with certain example implementations of the disclosed technology, the API server 126 may include a computer system configured to execute one or more application program interfaces (APIs) that provide various functionalities related to the operations of the system 100. In some embodiments, API server 126 may include API adapters that enable the API server 126 to interface with and utilize enterprise APIs maintained by the system 100 and/or an associated API's that may be housed on other systems or devices. In some embodiments, APIs can provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. In certain example implementations, the API server 126 may include one or more processors and/or one or more API databases, which may be any suitable repository of API data. In certain example implementations, information stored in the API server 126 may be accessed (e.g., retrieved, updated, and added to) via local network 114 and/or network 108 by one or more devices or systems (e.g., dialogue management system 122) of the system 100. In some embodiments, an API processor may be used to implement one or more APIs that can access, modify, and retrieve customer account information. In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, a transaction server) to exchange data with a server that implements the API (such as, for example, API server 126), in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally or alternatively, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

With continued reference to FIG. 1, the system 100 may include a natural language processing system (NLP system) 124, which may include a computer system configured to receive and process incoming dialogue messages and determine a meaning of the incoming dialogue message. For example, the NLP system 124 may be configured to receive and execute a command containing an incoming dialogue message where the command instructs the NLP system 124 to determine the meaning of the incoming dialogue message. The NLP system 124 may be configured to continuously or intermittently listen for and receive commands from a command queue to determine if there are any new commands directed to the NLP system 124. Upon receiving and processing an incoming dialogue message, the NLP system 124 may output the meaning of an incoming dialogue message in a format that other devices can process. For example, the NLP system 124 may receive an incoming dialogue message stating "Hello, I would like to know my account balance please," and may determine that this statement represents a request for an account balance. In certain example implementations, the NLP system 124 may be configured to output an event representing the meaning of the incoming dialogue message to an event queue for processing by another device. In some embodiments, the NLP system 124 may be configured to generate a natural language phrase in response to receiving a command. Accordingly, in some embodiments, the NLP system 124 may be configured to output an event that contains data representing natural language dialogue.

In accordance with certain example implementations of the disclosed technology, the NLP system 124 may include one or more processors and one or more NLP databases, which may be any suitable repository of NLP data. Information stored in the NLP system 124 may be accessed (e.g., retrieved, updated, and added to) via local network 114 and/or network 108 by one or more devices or systems (e.g., the dialogue management system 122) of the system 100. In some embodiments, an NLP processor may be used to implement an NLP system that can determine the meaning behind a string of text or voice message and convert it to a form that can be understood by other devices. In some embodiments, the NLP system 124 includes a natural language understanding component that generates an intent token based on analyzing user utterances. In some embodiments, the NLP system includes a natural language generation component that determines how the AI chat model (CBM 218) communicates language and creates personalized responses. In some embodiments the dialogue management system 122 determines what answer needs to be provided to the user based on the intent token. This may include retrieving user data from the API server 126, database 128, or customer information database 216. The natural language generation component of the NLP system 124 takes the machine-readable abstract of the answer (e.g., provide an account balance, provide recent transactions, explain an account status), based on the intent token and the customer context data, and converts it to an answer that the AI chatbot model (CBM 218) delivers to the customer (e.g., the user device 102) via the various communication channels (e.g., SMS messaging, etc.). The AI chatbot model (CBM 218) understands the user's natural language by mapping the utterances to intent tokens using the NLP system's 124 natural language understanding and then responds in natural language using the NLP system's 124 natural language generation.

The system 100 may optionally include a user interaction device 140 (e.g., a customer interaction device). The user interaction device 140 may be any computing device that can communicate with the network 108 or local network 114 and can accept user input from a customer. The user interaction device 140 may be a computing device that includes one or more processors and one or more user interaction device databases. For example, the user interaction device 140 may be, without limitation, a smart phone, a tablet, computer kiosk, an automated teller machine (ATM), a laptop computer, a desktop computer, etc. Information stored in the user interaction device 140 may be accessed (e.g., retrieved, updated, and added to) via local network 114 and/or network 108 by one or more devices or systems (e.g., the dialogue management system 122 and/or the NLP system 124) of the system 100.

The system 100 may optionally include a customer representative device 150. The user interaction device may be any computing device that can communicate with the network 108 or local network 114 and can accept user input from a customer representative (e.g., an employee associated with system 100). The customer representative device 150 may be a computing device that includes one or more processors and one or more user interaction device databases. For example, the customer representative device 150 may be, without limitation, a smart phone, a tablet, computer kiosk, an automated teller machine (ATM), a laptop computer, a desktop computer, etc. Information stored in the customer representative device 150 may be accessed (e.g., retrieved, updated, and added to) via local network 114 and/or network 108 by one or more devices or systems (e.g., the dialogue management system 122 and/or the NLP system 124) of the system 100.

Although the preceding description describes various functions of optional customer service interaction device 150, optional user interaction device 140, a web server 130, call center server, transaction server, dialogue management system 122, database 128, an API server 126, and a natural language processing (NLP) system 124, in some embodiments, some or all of these functions may be carried out by a single computing device.

The features and other aspects and principles of the disclosed embodiments may be implemented in various environments specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, certain disclosed embodiments may be implemented by general purpose machines configured to execute special software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
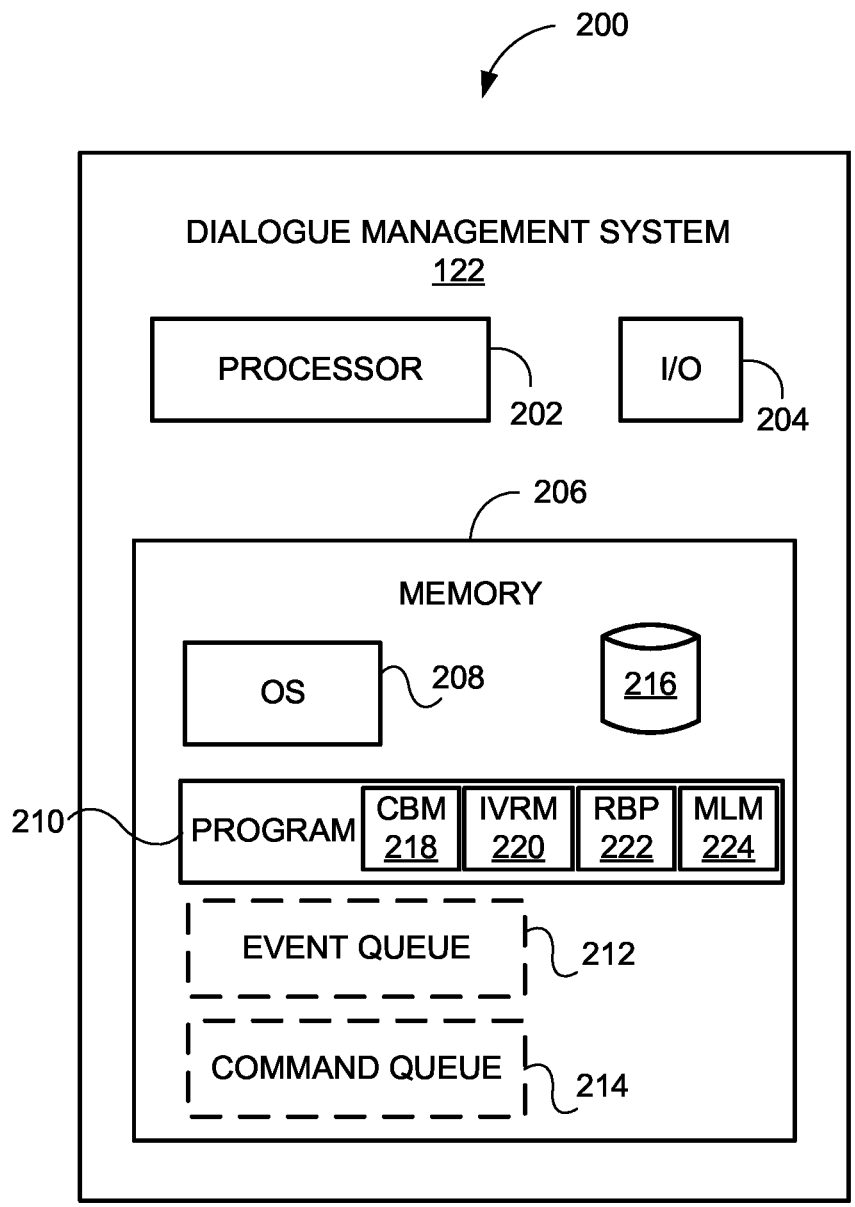
FIG. 2 is a component diagram 200 of an example dialogue management system.

FIG. 2 is a component diagram 200 depicting additional details of the example dialogue management system 122 (as shown in FIG. 1). In certain example implementations, one or more of the modules or components 110, 116, 118, 120, 122, 124, 126, 128, 130, 140, and 150 as shown and discussed above with reference to FIG. 1 (for example, the optional authentication system 116, the optional enrollment token store 118, the optional phone number data store 120, the natural language processing (NLP) system 124, the database 128, and one or more web servers 130) may be configured similarly as described with respect to dialogue management system 122. As shown in FIG. 2, dialogue management system 122 may include a processor 202, an input/output ("I/O") device 204, a memory 206 containing an operating system ("OS") 208 and one or more programs 210. For example, dialogue management system 122 may be a single server or may be configured as a distributed computer system including multiple servers or computers that interoperate to perform one or more of the processes and functionalities associated with the disclosed embodiments. In some embodiments, the dialogue management system 122 may further include a peripheral interface, a transceiver, a mobile network interface in communication with the processor 202, a bus configured to facilitate communication between the various components of the dialogue management system 122, and a power source configured to power one or more components of the dialogue management system 122.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), Wi-Fi™, Zig-Bee™ ambient backscatter communications (ABC) protocols or similar technologies.

A mobile network interface may provide access to a cellular network, the Internet, or another wide-area or local area network. In some embodiments, a mobile network interface may include hardware, firmware, and/or software that allows the processor(s) 202 to communicate with other devices via wired or wireless networks, whether local or wide area, private or public, as known in the art. A power source may be configured to provide an appropriate alternating current (AC) or direct current (DC) to power components.

The processor 202, for example, may include one or more of a microprocessor, microcontroller, digital signal processor, co-processor or the like, or combinations thereof, capable of executing stored instructions and operating upon stored data. The memory 206, for example, may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 206.

In certain example implementations, the processor 202 may be one or more known processing devices, such as, but not limited to, a microprocessor from the Pentium™ family manufactured by Intel™ or the Turion™ family manufactured by AMD™. The processor 202 may constitute a single core or multiple core processor that executes parallel processes simultaneously. For example, the processor 202 may be a single core processor that is configured with virtual processing technologies. In certain embodiments, the processor 202 may use logical processors to simultaneously execute and control multiple processes. The processor 202 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

According to an example implementation of the disclosed technology, the dialogue management system 122 may include one or more storage devices configured to store information used by processor 202 (or other components) to perform certain functions related to the disclosed embodiments. In one example the dialogue management system 122 may include memory 206 that includes instructions to enable processor 202 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, dialogue management system 122 may include memory 206 that includes instructions that, when executed by processor 202, perform one or more processes consistent with the functionalities disclosed herein. Methods, systems, and articles of manufacture consistent with disclosed embodiments are not limited to separate programs or computers configured to perform dedicated tasks. For example, dialogue management system 122 may include memory 206 that may include one or more programs 210 to perform one or more functions of the disclosed embodiments. For example, in some embodiments, dialogue management system 122 may include a rules-based platform (RBP) 222 for generating zero or more commands in response to processing an event, in accordance with a set of predefined rules. In some embodiments, dialogue management system 122 may include a trained machine learning model (MLM) 224 for generating zero or more commands in response to processing an event, in accordance with a model that may be continuously or intermittently updated. In some embodiments, the dialogue management system 122 may include an interactive voice response (IVR) model (IVRM) 220, which voice-interaction model for interacting with a customer via voice-based communications (e.g., a phone call). In some embodiments, the dialogue management system 122 may include a chatbot model (CBM) 218 (i.e., an AI chatbot model) for interacting with a customer via text-based or voice-based AI communications (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session). Although not shown, in some embodiments, the dialogue management system 122 may include a voice-based chatbot model and separate a text-based chatbot model where the voice-based chatbot model would interact with the customer via voice (e.g., a phone call AI chat session, a mobile application voice-based AI chat session, a smart speaker application voice-based AI chat session, a vehicle entertainment system application voice-based AI chat session) and the text-based chatbot model would interact with the customer via text (an SMS AI chat session, a mobile application text-based AI chat session, email AI chat session, web-based AI chat session). In other embodiments, each communication channel may have its own model (a phone call AI chat session model, a mobile application voice-based AI chat session model, a smart speaker application voice-based AI chat session model, a vehicle entertainment system application voice-based AI chat session model, an SMS AI chat session model, a mobile application text-based AI chat session model, email AI chat session model, and web-based AI chat session model, etc.). Although various embodiments in this application discuss transferring from a non-AI voice-based communications forms (e.g., IVR, customer service representative, or in-person servicing at a brick-and-mortar store) to text-based communication (e.g., an SMS AI chat session, a mobile application text-based AI chat session, email AI chat session, web-based AI chat session), or to voice-based communications, it is envisioned that a user may be transferred, in a similar fashion, from any AI communication form to another AI communication form and from any non-AI communication form to an AI communication form. For example, a user may be transferred from text (e.g., an SMS AI chat session or customer representative agent chat session) to text (e.g., an email AI chat session), voice (e.g., IVR or a mobile application voice-based AI chat session) to voice (e.g., a smart speaker application voice-based AI chat session model), text (e.g., an SMS AI chat session or customer representative agent chat session) to voice (e.g., a phone call AI chat session), and voice (e.g., IVR, customer service representative, or in-person servicing at a brick-and-mortar store, or a mobile application voice-based AI chat session) to text (e.g., an SMS AI chat session). Switching to and between the various models or communication forms within the models may be based on user preference, a servicing intent (e.g., what can be best communicated based on the servicing intent, or the AI model may recommend an optimal communication channel. In some embodiment, the dialogue management system 122 may communicate to the user to all communication channels (e.g., a phone call AI chat session, a mobile application voice-based AI chat session, a smart speaker application voice-based AI chat session, a vehicle entertainment system application voice-based AI chat session, an SMS AI chat session, a mobile application text-based AI chat session, email AI chat session, web-based AI chat session). Moreover, the processor 202 may execute one or more programs 210 located remotely from system 100. For example, system 100 may access one or more remote programs 210 (such as rules-based platform 222 or trained machine learning model 224), that, when executed, perform functions related to disclosed embodiments.

The memory 206 may include one or more memory devices that store data and instructions used to perform one or more features of the disclosed embodiments. The memory 206 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 206 may include software components that, when executed by processor 202, perform one or more processes consistent with the disclosed embodiments. In some embodiments, memory 206 may include a customer information database 216 for storing related data to enable dialogue management system 122 to perform one or more of the processes and functionalities associated with the disclosed embodiments. The customer information database 216 may include stored data relating to a customer profile and customer accounts, such as for example, personally identifiable information (e.g., first name, last name, age, sex, birthday, phone number, address, VIP status, key customer status, preferences, preferred language, vehicle(s) owned, greeting name, channel, talking points (e.g., favorite sports team), bank account number, mortgage loan account number, car loan account number, healthcare account number (e.g., healthcare insurance account number or a lab work account number) etc.), bank accounts, mortgage loan accounts, car loan accounts, healthcare account (e.g., healthcare insurance account or a lab work account), other such accounts, account numbers, authorized users associated with one or more accounts, account balances, account payment history, and other such typical account information. The customer information database 216 may further include stored data relating to previous interactions between an organization (or its related entity) and a customer. For example, the customer information database 216 may store customer interaction data that includes records of previous customer service interactions with a customer via a website, SMS, a chat program, a mobile application, an IVR model, or notations taken after speaking with a customer service agent. The customer information database 216 may also include information about business transactions between an organization (and/or its related entity) and a customer that may be obtained from, for example, a transaction server. The customer information database 216 may also include customer feedback data such as an indication of whether an automated interaction with a customer was successful, online surveys filled out by a customer, surveys answered by a customer following previous interactions to the account provider, digital feedback provided through websites or mobile application associated with the organization or its related entity (e.g., selecting a smiley face or thumbs up to indicate approval), reviews written by a customer, complaint forms filled out by a customer, information obtained from verbal interactions with customer (e.g., information derived from a transcript of a customer service call with customer that is generated using, for example, voice recognition techniques) or any other types of communications from a customer to the organization or its related entity. According to some embodiments, the functions provided by the customer information database 216 may also be provided by a database that is external to the dialogue management system 122.

In accordance with certain example implementations of the disclosed technology, the memory 206 may also include an event queue 212 for temporarily storing queued events and a command queue 214 for temporarily storing queued commands. The processor 202 may receive events from the event queue 212 and in response to processing the event using the rules-based platform 222 and/or the trained machine learning model 224, generate zero or more commands to be output to the command queue 214. According to some embodiments, dialogue management system 122 may place commands in the command queue 214 in the order they are generated. In certain example implementations of the disclosed technology, the command queue 214 may be monitored to detect commands that are designated to be executed by the monitoring device and may access pertinent commands. The event queue 212 may receive events from other devices. According to some embodiments, events may be placed in the event queue 212 in a first-in first-out (FIFO) order, such that events may then processed by the dialogue management system 122 in the order they are received or generated.

The dialogue management system 122 may also be communicatively connected to one or more memory devices (e.g., databases) locally or through a network. The remote memory devices may be configured to store information and may be accessed and/or managed by dialogue management system 122. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The dialogue management system 122 may also include one or more I/O devices 204 that may include one or more interfaces for receiving signals or input from devices and providing signals or output to one or more devices that allow data to be received and/or transmitted by dialogue management system 122. For example, dialogue management system 122 may include interface components, which may provide interfaces to one or more input devices, such as one or more keyboards, mouse devices, touch screens, track pads, trackballs, scroll wheels, digital cameras, microphones, sensors, and the like, that enable dialogue management system 122 to receive data from one or more users (such as, for example, via user device 102, as discussed with reference to FIG. 1).

In certain embodiments of the disclosed technology, the dialogue management system 122 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While dialogue management system 122 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the dialogue management system 122 may include a greater or lesser number of components than those illustrated.

Figure 3:
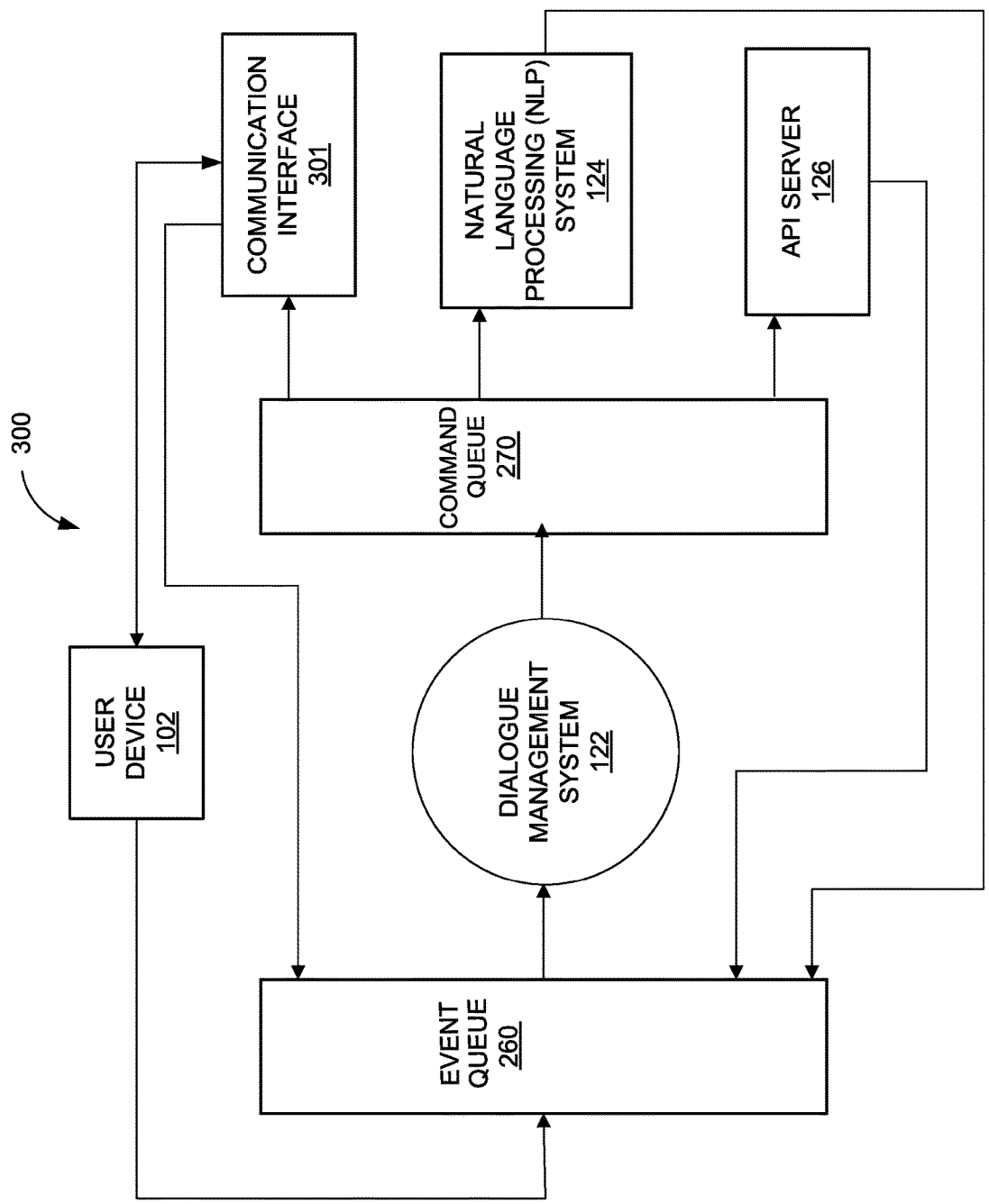
FIG. 3 is an example intelligent assistant system functionality diagram 300 for providing automated natural language dialogue for account servicing.

FIG. 3 is an example intelligent assistant system functionality diagram 300 for providing automated natural language dialogue for account servicing. Certain processes discussed with respect to FIG. 3 (as discussed in detail below) may be executed by the system 100, as discussed above with respect to FIG. 1.

A first event may be placed in the event queue 212 in response to receiving a customer dialogue message, for example, from the user device 102. According to certain example implementations of the disclosed technology, a customer dialogue message may be sent using various communication mediums, such as for example, SMS, a voice-to-text device, a chat application, an instant messaging application, a mobile application, an Internet-of-Things application, a smart speaker application, a vehicle entertainment system application, an IVR model, or any other such medium that may be sufficient to send and receive electronic communications. Responsive to the incoming customer dialog message, the event may be generated by, for example, a RESTful API interfacing with a receiving device of the system 100.

In accordance with certain example implementations of the disclosed technology, after the event is created, it may be placed in the event queue 212. An event queue 212 may be configured to temporarily store a plurality of events. According to some embodiments, events are placed in the event queue in a first-in first-out (FIFO) manner, such that the events will be executed in the order that they were received. In some embodiments, the event queue 212 and/or the command queue 214 may be part of the dialogue management system 122. In some embodiments, both the event queue 212 and the command queue 214 may be present on a device or component other than dialogue management system 122. For example, in some embodiments, the event queue 212 and the command queue 214 may be maintained on a cloud server that is accessible by the dialogue management system 122, the API server 126, the NLP system 124, and/or the communication interface 301. According to some embodiments, an event may represent different types of information such as, for example, text received from a customer, voice/audio information received from a customer, customer account information, or a request to perform some account-related action. For example, an event might represent a user dialogue message that has been sent to system 100 via SMS, a mobile application text message, or an online- or web-based AI chat session that read "Hello, can you please tell me my account balance?" According to some embodiments, an event may have certain metadata (such as a phone number and/or token) associated with it that is sufficient to allow the system to determine the identity of a customer associated with the event and/or a communication medium from which the even originated.

According to some embodiments, the dialogue management system 122 may continuously or intermittently monitor the event queue 212. In response to detecting an event (e.g., the first event) in the event queue, the event may be received at the dialogue management system 122 from the event queue 212. In some embodiments, the dialogue management system 122 may include a rules-based platform, a trained machine learning model, and a customer context. According to some embodiments, the customer context may be derived from customer information associated with a particular customer that is stored in the system 100. For example, customer information may be stored in the optional phone number data store 120, the optional enrollment token store 118, and/or the database 128 shown in FIG. 1 and/or the database 216 shown in FIG. 2. In some embodiments, the customer information may include one or more of account types, account statuses, phone number, token, transaction history, conversation history, people models, an estimate of customer sentiment, customer goals, and customer social media information. In accordance with certain example implementations of the disclosed technology, the system 100 may be configured to adapt and tailor its responses to a particular customer based on the customer context and/or customer information. According to some embodiments, the customer context may be updated each time the dialogue management system 122 receives a new event from the event queue 212. For example, in some embodiments, the customer context may be updated by the dialogue management system 122 responsive to receiving updated customer information.

In certain example implementations, the dialogue management system 122 may, in response to processing the first event, generate a first command to be placed in a command queue 214. According to some embodiments, the dialogue management system 122 may generate a command based on the processed event, the customer context, and/or customer information using one or more of a rules-based platform 222 and a trained machine learning model 224 as discussed with reference to FIG. 2. For example, in some use cases a command may be generated using the rules-based platform 222, whereas in other use cases a command may be generated using the trained machine learning model 224, and further use cases may be handled by both the rules-based platform 222 and the trained machine learning model 224 working in concert. In some embodiments, the trained machine learning model 224 may be used as a way of enhancing the performance of the rules-based platform 222 by, for example, determining which rules have priority over other rules and what rules should be applied in a given context. According to some embodiments, the commands generated by the dialogue management system 122 in response to a particular event may change as the customer context and/or customer information is updated over time. Further, changes to the rules in the rules-based platform 222 or further training of the machine learning model 224 may also result in different commands being generated in response to the same event. According to some embodiments, the trained machine learning model 224 may be trained by updating a natural language processing device database with communications from customers that have been labeled using, for example, a web user interface. Such data in the natural language processing device database may undergo supervised training in a neural network model using a neural network training algorithm while the model is offline before being deployed in the system 100.

According to some embodiments, an NLP model of the system 100 may utilize deep learning models such as convolutional neural network (CNN) that transforms a word into a word vector and long short-term memory (LSTM) that transforms a sequence of word vectors into intent. The NLP model may also be trained to recognize named entities in addition to intents. For example, a named entity may include persons, places, organizations, account types, and product types. According to some embodiments, when the dialogue management system 122 generates a command, such as a first command, it may determine an entity that will execute the command, such as, for example, the API server 126, the NLP system 124, a communication interface 301, or some other device or component, such that only the determined type of entity may pull the command from the command queue 214. For example, in the embodiment shown in FIG. 3, the dialogue management system 122 may determine that the first command is to be executed by the NLP system 124 to determine the meaning of the incoming customer dialogue message. According to some embodiments, at the time the dialogue management system 122 creates a new command, the dialogue management system 122 may also update the customer information database 216 (and/or database 128) with information about a previous or concurrent transaction or customer interaction.

In accordance with certain example implementations of the disclosed technology, and with continued reference to FIG. 3, the NLP system 124 may receive the first command from the command queue 214, execute the command, and generate a second event to be placed in the event queue 212. According to some embodiments, the NLP system 124 may continuously or intermittently monitor the command queue 214 to detect new commands and upon detecting a new command, may receive the command from the command queue 214. Upon receiving a command, the NLP system 124 may perform various functions depending on the nature of the command. For example, in some cases, the NLP system 124 may determine the meaning of an incoming dialogue message in response to executing the command. According to some embodiments, the NLP system 124 may determine the meaning of an incoming dialogue message by utilizing one or more of the following artificial intelligence techniques: intent classification, named entity recognition, sentiment analysis, relation extraction, semantic role labeling, question analysis, rule extraction and discovery, and story understanding. Intent classification may include mapping text, audio, video, and/or or other media into an intent chosen from a set of intents, which represent what a customer is stating, requesting, commanding, asking, or promising, in an incoming customer dialogue message. Intent classifications may include, for example, a request for an account balance, a request to activate a credit/debit card, an indication of satisfaction, a request to transfer funds, or any other intent a customer may have in communicating a message. Named entity recognition may involve identifying named entities such as persons, places, organizations, account types, and product types in text, audio, video, or other media. Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be for example, a "customer of" relation that indicates that a person is a customer of an organization. Semantic role labeling may involve identifying predicates along with roles that participants play in text, audio, video, or other media. An example of semantic role labeling may be identifying (1) the predicate Eat, (2) Tim, who plays the role of Agent, and (3) orange, which plays the role of Patient, in the sentence "Tim ate the orange." Question analysis may involve performing natural language analysis on a question, including syntactic parsing, intent classification, semantic role labeling, relation extraction, information extraction, classifying the type of question, and identifying what type of entity is being requested. Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, the NLP system 124 may perform natural language generation in response to receiving a command. According to some embodiments, the NLP system 124 may perform natural language generation by utilizing one or more of the following artificial intelligence techniques: content determination, discourse structuring, referring expression generation, lexicalization, linguistic realization, explanation generation. Content determination may involve deciding what content to present to the customer out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. Linguistic realization may involve determining what linguistic structures, such as grammatical constructions, to use to express an idea. Explanation generation may involve generating a humanly-understandable, transparent explanation of a conclusion, chain of reasoning, or result of a machine learning model. In the example embodiment shown in FIG. 3, the NLP system 124 may determine the meaning of the incoming customer dialogue message and may convert it to a form that can be processed by the dialogue management system 122. Accordingly, the second event generated by the NLP system 124 may represent a determined meaning of the incoming customer dialogue message and the NLP system 124 may send the second event to the event queue 212.

In accordance with certain example implementations of the disclosed technology, the dialogue management system 122 may receive the second event from the event queue 212. In some embodiments, the dialogue management system 122 may also update the customer context by receiving updated customer information. In response to processing the second event, the dialogue management system 122 may generate a second command to be placed in a command queue 214. According to some embodiments, dialogue management system 122 may generate the second command based on the processed event, the customer context, and/or the customer information using one or more of a rules-based platform 222 and a trained machine learning model 224 as described above with respect to FIG. 2.

In the example embodiment shown in FIG. 3, the second event may represent a customer's request to know, for example, their account balance. Based on the customer context, customer information, rules-based platform 222 and/or trained machine learning model 224, the dialogue management system 122 may decide, for example, using predictive analytics that it has enough information to create a second event that represents instructions to an API associated with the API server 126 to look up the customer's account balance. However, in some embodiments, the dialogue management system 122 may decide that, for example, it is too uncertain as to which account the customer is seeking information about and may instead create a second event that represents instructions to the communication interface 301 to send a message to the user device 102 requesting more information. Accordingly, based on the customer context, the rules-based platform 222, and the trained machine learning model 224, the dialogue management system 122 may change or adapt its responses to a given request over time.

In accordance with certain example implementations of the disclosed technology, the API server 126 may receive the second command from command queue 214, execute the command, and generate a third event to be placed in event queue 212. According to some embodiments, the API server 126 may continuously or intermittently monitor the command queue 214 to detect new commands and, upon detecting a new command, may receive the command from the command queue 214. Upon receiving a command, the API server 126 may perform various functions depending on the nature of the command. For example, in some cases, the API server 126 call up an API stored locally or remotely on another device, to retrieve customer data (e.g., retrieve an account balance), perform an account action (e.g., make a payment on a customer account), authenticate a customer (e.g., verify customer credentials), check a status of a revocable token, and/or execute an opt-in/opt-out command (e.g., change account to opt-in to paperless notifications, opt-in or opt-out of account servicing by SMS texting, etc.). Accordingly, in some embodiments, the third event may represent, for example, a retrieved account balance, an acknowledgement of the performance of an account action, an acknowledgement of the execution of an opt-in/opt-out command, a verification or denial of a customer's credentials, a revocation of a token, etc.

In certain example implementations, the dialogue management system 122 may receive the third event from the event queue 212 in response to detecting it as described above. In some embodiments, dialogue management system 122 may also update the customer context by receiving updated customer information. The dialogue management system 122 may, in response to processing the third event, generate a third command to be placed in command queue 214. According to some embodiments, dialogue management system 122 may generate the third command based on the processed third event, the customer context, and/or customer information using one or more of rules-based platform 222 and trained machine learning model 224 in a fashion similar to the generation of the first command described above. In some embodiments, dialogue management system 122 may also generate a response dialogue message in response to processing an event, such as the third event. In some embodiments, dialogue management system 122 may receive a response dialogue message as an event produced by NLP system 124. According to some embodiments, the third command may represent a command or instruction to communication interface 301 to transmit the response dialogue message to, for example, user device 102.

In certain example implementations, the communication interface 301 may receive and execute the third command, which may cause the communication interface 301 to transmit (e.g., via an SMS AI chat session, via a mobile application text-based AI chat session, via an email AI chat session, via a web-based AI chat session, via a phone call AI chat session, via a mobile application voice-based AI chat session, via a smart speaker application voice-based AI chat session, via a vehicle entertainment system application voice-based AI chat session, etc.) the response dialogue message to user device 102. In some embodiments, the communication interface 301 may continuously or intermittently monitor the command queue 214 for new commands and may receive the third command in response to detecting the third command in command queue 214. According to some embodiments, the communication interface 301 may be a standalone device or system having some or all of the elements of dialogue management system 122 as shown in FIG. 2. In some embodiments, communication interface 301 may be integrated into dialogue management system 122. In some embodiments, the communication interface 301 may be integrated into or associated with another device or system of the system 100, such as, for example, the API gateway 110, the local network 114, the web server 130, the API server 126, or the NLP system 124. In accordance with certain example implementations of the disclosed technology, the communication interface 301 may be configured to send "contact card" information (in the form of a SMS message, for example) to the user device 102 upon authentication and enrollment in the SMS account servicing. For example, the "contact card" information may provide a convenient way for the user device 102 to receive and store (for example, in the user's contacts) the SMS number associated with the intelligent assistant system.

As discussed with respect to FIGS. 1-3, the system 100 may enable automating natural language dialogue with a customer by utilizing the structure provided by the event queue 212, dialogue management system 122, command queue 214, API server 126, NLP system 124, and communication interface 301 to adaptively respond to customer messages. Certain example implementations of the disclosed technology may leverage artificial intelligence in the machine learning models and natural language processing system to adaptively respond to customer communications using natural language. In certain example implementations, the use of a repeatedly updating customer context and information may enable the system 100 to generate and provide customized responses to individual customers and adapt the responses over time. By utilizing artificial intelligence and machine-learning by the NLP system 124, and by repeatedly updating customer context/information maintained by the dialogue management system 122, the system may enable the non-deterministic, adaptive, and customized conversational responses to customer dialogue messages. Further, according to some embodiments, the system 100 may enable asynchronous processing of events and creation of commands by the dialogue management system 122. Further, while FIG. 3 and the related description appear to show a particular single cycle of events, it should be appreciated that multiple different cycles of events may be processed in parallel by the dialogue management system 122.

In some embodiments, the trained machine learning model 224 (as discussed with reference to FIG. 2) may include a people model that serves to estimate a customer's mindset per use case, and over time. For example, the people model may estimate how stressed out a customer is and determine, for example, how fast they want to conduct a transaction or interaction. The trained machine learning model 224 may include, for example, a relevance measure that may quantitatively assess how relevant a particular conversion with a customer is based on the percent of task completion and rate of return conversations. The trained machine learning model 224 may include an affect recognition functionality that seeks to recognize a customer's emotions based on facial expressions, audio speech signals, images, gestures, blood pressure, heart rate, or other such customer data that may be collected by a user device 102 and transmitted to the system 100. In some embodiments, the trained machine learning model 224 may include payment and financial planning features that model risk factors, savings, and spending patterns over time. In some embodiments, the trained machine learning module 224 may include observations of the accuracy and effectiveness of the automated natural language interactions by tracking business metrics over time, such as for example, a reduction in call center volume over a period of time. In some embodiments, the trained machine learning module 224 may enable the execution of hypothesis-driven micro-experiments that enable the system to test a model hypothesis on a small population of users to validate whether the hypotheses are valid or not.

In some embodiments, the system 100 architecture may allow the API server 126, the NLP system 124, and the communication interface 301 to operate independently from one another by separately pulling commands from command queue 214. In certain example implementations, the system 100 may provide the advantage of asynchronous operations. Accordingly, the entire system may be stateless, with no side effects to calling a particular function.

Figure 4:
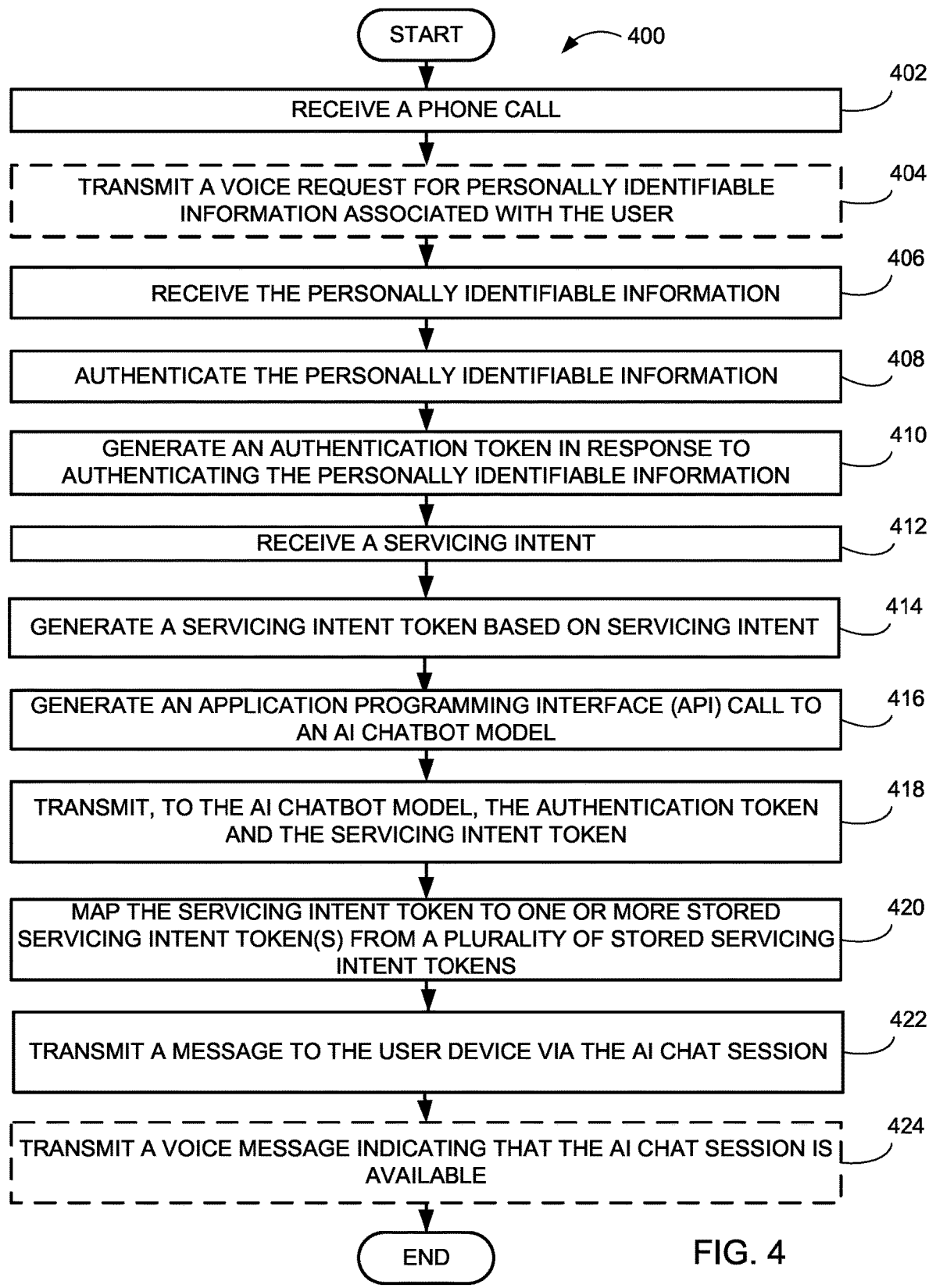
FIG. 4 is a flowchart of a method 400 for transitioning a telephony call to an AI chat session.

FIG. 4 is a flowchart of a method 400 for transitioning a telephony call (e.g., a human customer representative or an IVR call) to an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session). In certain example implementations, one or more of the steps of the method 400 may be performed by dialogue management system 122 using processor 202 to execute memory 206. In some embodiments, steps of method 400 may be delegated to other components, such as the user device 102, and/or components associated with the system 100. Following method 400, the system 100 may engage in an AI chat session with user device 102 by transmitting additional message(s) for display by user device 102. Additionally, the system 100 may be configured to optionally transition back to another communication medium (e.g., if transitioned to an SMS AI chat session via method 400, operationally transitioning to a second IVR call, a mobile application text-based AI chat session, an email-based AI chat session, web browser-based AI chat session,) as determined by the system 100 based on one or more of the type of information being requested, or additionally requested, by the user and user preference(s).

In block 402, the method 400 includes receiving, from a user device 102 associated with the user, a phone call. For example, the user of the user device 102 may dial a phone number associated with system 100, thereby connecting with an IVR model 220 of the dialogue management system 122.

In block 404, the method 400 optionally includes transmitting, to the user device 102 via the phone call, a voice request for personally identifiable information associated with the user. For example, the dialogue management system 122 via the IVR model 220 may verbally request from the user, through the user device 102, the user's first and last name and birthdate or other personally identifiable information in an attempt to identify the user. Personally identifiable information may include but are not limited to first name, last name, birthdate, age, sex, birthday, social security number, address, VIP status, key customer status, preferences, preferred language, vehicle(s) owned, greeting name, channel, talking points (e.g., favorite sports team), etc.), bank accounts, mortgage loan accounts, car loan accounts, healthcare accounts, other such accounts, account numbers, authorized users associated with one or more accounts, account balances, account payment history, and other such typical account information associated with a user, who may be a customer or member of the organization associated with and/or utilizing the system 100

In block 406, responsive to the request in block 404, the method 400 includes receiving personally identifiable information associated with the user. For example, if the dialogue management system 122 requested the first name, last name, and birthday, the user may speak into his user device 102 a first name, last name, and birthdate, which is then received by the dialogue management system 122.

Although not shown, in some embodiments, the dialogue management system 122 may determine whether the received personally identifiable information is complete. If the received personally identifiable information is incomplete (e.g., a user only supplies her first name), the dialogue management system 122 may iteratively request for additional personally identifiable information (e.g., a last name and a birthday) until it determines that received personally indefinable information is sufficient to successfully identify the user via the system 100. If the received personally identifiable information is sufficient to successfully identify the user, the dialogue management system 122 may move to block 408 to authenticate the personally identifiable information and the additional personally identifiable information.

In block 408, the method 400 includes authenticating the received personally identifiable information or at least a portion thereof. For example, the dialogue management system 122 may compare the received personally identifiable with information associated with the identified user that is stored in customer information database 216 to determine if the information matches (e.g., beyond a predetermined confidence threshold). If the received personally identifiable information matches the stored personally identifiable information, then the dialogue management system 122 authenticates the personally identifiable information. If, however, the received personally identifiable information does not match any stored personally identifiable information associated with the identified user, the dialogue management system 122 may, via the IVR model 220, request additional personally identifiable information or direct the user (e.g., via the user device 102) to register with the dialogue management system 122 (e.g., online, via a related mobile application, or at a merchant location associated with the system 100). Alternatively, if the received personally identifiable information does not match any stored personally identifiable information associated with the identified user, the dialogue management system 122 may, via the IVR model 220, request to update some personally identifiable information online or via a related mobile application. It is contemplated that the system 100 may have built in password recovery and reset features (e.g., with security questions) to allow the user to authenticate himself even when the received personally identifiable information does not match any stored personally identifiable information associated with the identified user. The system 100 may also impose limits on the number of attempts or time duration that the user may provide personally identifiable information and/or attempt to recover or reset his password, and such imposed limits may be preset based on a security level associated with the user's account and/or preferences provided by the user in advance of the phone call.

In block 410, the method 400 includes generating an authentication token in response to authenticating the personally identifiable information. The authentication system 116 may generate the authentication token in response to authenticating the personally identifiable information. The authentication token serves as evidence that the user of user device 102 is authenticated. As will be described later, this authentication token may be transferred to other models (or services) (e.g., an AI chatbot model, a mobile application model, or another related model associated with another communication medium) as proof that the authentication system 116 has already authenticated the user.

In block 412, the method 400 includes receiving, from the user device 102, a servicing intent, which may occur in response to a prompt (e.g., visual or audible) from the system 100 via the user device 102. The dialogue management system 122 may receive an option selected by the user via a user input feature (e.g., button or input feature on a touch screen) of user device 102. For example, the user of user device 102 presses 2 on a touch tone menu indicating that they are requesting an account balance, which is received by the dialogue management system 122. In some embodiments, the NLP system 124 may receive a user utterance corresponding to the servicing intent and determine the serving intent from the user utterance. The servicing intent may include, but is not limited to, add or remove a user from an account, request a refund, dispute a charge to a credit card account or bank account, a request for an account balance, a request for recent transactions, a request to update an email address of the user, a request for a bank card (e.g., a debit card or a credit card), a request for why a recent transaction was declined, a request for an explanation of the current account balance, a request to schedule a doctor's appointment, a request to receive lab results, or combinations thereof.

In block 414, the method 400 includes generating a servicing intent token. The dialogue management system 122 generates the servicing intent token as evidence of the user's intent. As will be described later, this serving intent token may be transferred to other models (or services) (e.g., an AI chatbot model) as proof that the dialogue management system 122 has already received the user's intent.

In block 416, the method 400 includes generating an application programming interface (API) call to an AI chatbot model. For example, the dialogue management system 122 may call its CBM 218 in order to prepare to transmit information to the CBM 218.

In block 418, the method 400 includes transmitting, to the AI chatbot model, the authentication token and the servicing intent token. For example, the dialogue management system 122 may transmit the authentication token to the CBM 218 so that the CBM 218 does not have to separately authenticate the user of user device 102. That is, once a user transitions to an AI chat session, the user will not need to repeat identification and authentication steps that were already performed with the IVR model. Additionally, the dialogue management system 122 may transmit to the CBM 218 the servicing intent token so that the user of the user device 102 does not have to explain the reason for their call again to the CBM 218 (i.e., the AI chatbot model). This provides an expedited user experience while not occupying system resources (e.g., in this case the CBM 218) to repeat identification, authentication, and/or service intent identification steps that were previously performed by another related model (e.g., in this example the IVR model).

In block 420, the method 400 includes mapping the servicing intent token to one or more stored servicing intent tokens from a plurality of stored servicing intent tokens. For example, the dialogue management system 122 may map the servicing intent token to one or more stored servicing intent tokens of the plurality of stored servicing intent tokens. The plurality of stored servicing intent tokens may be stored in customer information database 216 or database 128, and may be associated with a particular model (e.g., in this case the AI chatbot model). In this fashion, the servicing intent tokens recognized in one model (e.g., the IVR model) may be mapped to a similar but model-specific stored servicing intent token that can be used by another related model (e.g., the AI chatbot model).

In block 422, the method 400 includes transmitting a message to the user device 102 via an AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, a vehicle entertainment system application voice-based AI chat session). For example, the dialogue management system 122 may, via CBM 218, transmit a welcome or first message to the user device 102. The welcome message may simply be "Welcome. I am working to assist you on your issue now." In other embodiments, the welcome message may include identifier(s) indicative of one or more of (i) that the user has been identified (e.g., by displaying a user name in the message or elsewhere in the AI chat session display), (ii) that the user has been authenticated (e.g., by displaying a check next to the user name), and (iii) the mapped stored servicing intent (e.g., adding onto or replacing part of the welcome message with "Welcome. I am working to assist you with your balance transfer request from Account No. 1234 to Account No. 5678. Please confirm that you would like to proceed.") so that the user may confirm that the mapping aligns with the user's request. In some embodiments, the dialogue management system 122 may transmit an answer (described below) to the servicing intent with the welcome message or in lieu of the welcome message.

The welcome message may be communicated via one or more messaging channels including a short message service (SMS) message channel, a mobile application notification channel, or an email message channel. It is contemplated that the AI chatbot model may be capable of using one or more these communication mediums in some embodiments. In other embodiments, a separate model (e.g., an SMS AI chatbot model, a mobile application AI chatbot model, and an email AI chatbot model) may be dedicated to a particular communication medium such that each model is configured to process and generate communications of a single medium type. If the email message channel is used, the email sent to the user device 102, via a stored email address associated with the user or an email address provided during the phone call associated with the user, may comprise a link to a web browser-based AI chatbot.

The method may include a further step (not shown) of selecting the one or more messaging channels based on one or more rules, predictive machine learning based on one or more user preferences (which may be stored by the system 100 or provided during the phone call) and/or servicing intent types, or combinations thereof. Selecting one or more messaging channels may be based on one or more rules. The one or more rules may include, for example, determining whether the user device has a corresponding mobile application installed and, if so, defaulting to communication via the mobile application. Or, responsive to determining that the user device does not have the corresponding mobile application installed, selecting the SMS message channel when the user has a stored phone number on the system 100 or selecting the email message channel when the user does not have a stored phone number on the system 100 but does have a stored email address. The rules may also include a servicing intent type associated with a user request. For example, the system may default to the SMS message channel for a first servicing intent type (e.g., associated with responses to the user request that can be displayed on single screen for a typical user device or the specific user device 102), and default to the email message channel for a second servicing type (e.g., associated with responses to the user request that cannot be displayed on a single screen for a typical user device or the specific user device 102). Selecting one or more messaging channels may be based on predictive learning for determining one or more implicit preferences of the user based on a history of interactions with the user. For example, the dialogue management system 122 may have stored in database 128 or customer information database 216 that the past three interactions with the authenticated user has been over SMS messaging. Thus, the dialogue management system 122 may decide that the user prefers a conversation over SMS message channel as opposed to mobile application notification channel or email/Internet based channel, and default to using SMS messaging for future communications unless the user indicates a user preference for another communication channel before or during the phone call (e.g., the dialogue management system 122 may receive a messaging channel selection from the user device 102). The messaging channel selection may be indicative of the user's preference for one or more messaging channels of the SM message channel, the mobile application notification channel, and the email message channel. Predictive machine learning may also take into account servicing intent types as described above with respect to the rules (e.g., the system 100 may learn that most customers are or an "average customer" is most satisfied when a first servicing intent type is addressed via the SMS channel message and default to that communication medium when the user request is determined to be of the first servicing intent type).

In optional block 424, the method 400 may include transmitting a voice message, via an IVR model 220, indicating that the AI chat session is available. For example, the voice message may state "The chat session is available." The system 100 may default to not provide the voice message unless a response to the welcome message is not received within a predetermined time threshold. For example, if two minutes pass after the system 100 provides the welcome message via the user device 102, the system 100 may additionally provide the voice message to ensure that the user notices the welcome message or the answer.

The method may also include transmitting, via the AI chat session using CBM 218, an answer to the user device 102 based on the servicing intent. The answer may be providing the user device 102 with their requested account balance. Other answers may include providing the user of the user device 102 with their requested recent transactions or providing the user of the user device 102 with an answer as to why a recent transaction was declined (e.g., the transaction was made in a foreign country). The method may include storing text-based interactions or voice-based interaction (e.g., a recording) comprising the answer in customer information database 216 or database 128. In some embodiments, the answer includes a deep link that allows the user device 102 to perform an action in a mobile application or a web browser based on the servicing intent and without additional authentication. The deep link may be a hyperlink with an embedded user identifier unique to the user and an embedded request identifier unique to a particular request for the user. For example, a user of a user device 102, who has a servicing intent of requesting her account balance, may select a deep link, sent to the user device via an SMS messaging channel, which opens to the user's account balance on a banking website or a mobile application without the user needing to enter a username and password.

Figure 5:
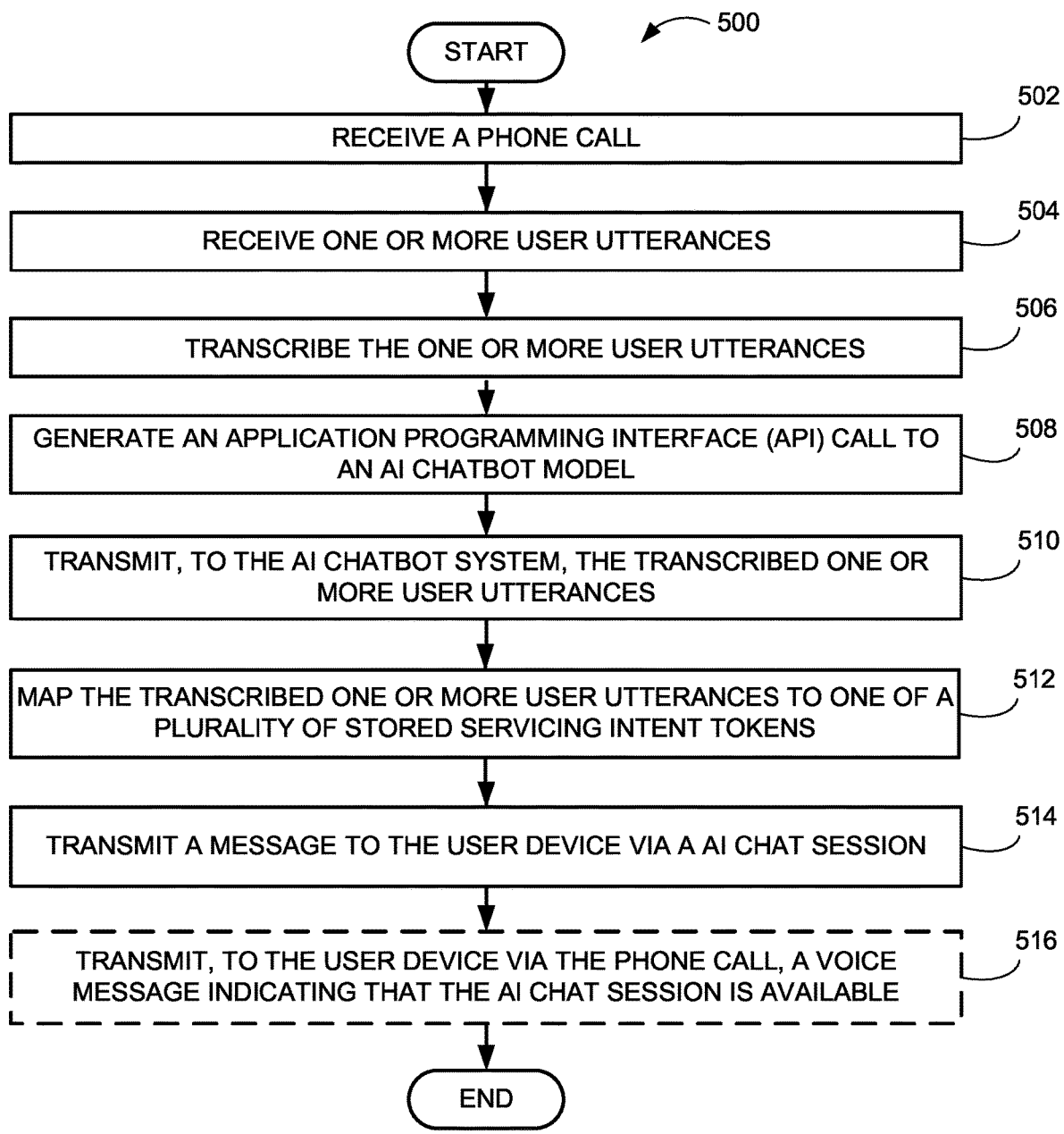
FIG. 5 is a flowchart of another method 500 for transitioning a telephony call to an AI chat session.

FIG. 5 is a flowchart of a method 500 for transitioning an IVR call to an AI chat session. In certain example implementations, one or more of the steps of the method 500 may be performed by dialogue management system 122 using processor 202 to execute memory 206. In some embodiments, steps of method 500 may be delegated to other components, such as the user device 102, and/or components associated with the system 100. Following method 500, the system 100 may transmit a message for output (e.g., display or for audio/voice output) by, for example, user device 102.

In block 502, the method 500 includes receiving, from a user device 102 associated with the user, a phone call as similarly described with respect to block 402. For example, the user of the user device 102 may dial a phone number associated with system 100 thereby connecting with an IVR model 220 of the dialogue management system 122 or a live customer service representative.

In block 504, the method 500 includes receiving, form the user device 102 via the phone call, one or more user utterances as similarly described with respect to block 406. For example, a user may speak into the user device 102 "What is my account balance?," which may be received by the dialogue management system 122 via the phone call. The dialogue management system 122 may record the one or more user utterances.

In block 506, the method 500 includes generating an application programming interface (API) call to an AI chatbot model as similarly described with respect to block 416. For example, the dialogue management system 122 may call its CBM 218 in order to prepare to transmit information to the CBM 218.

In block 508, the method 500 includes transmitting, to the AI chatbot model (e.g., CBM 218), the one or more user utterances. For example, the dialogue management system 122 may transmit to the CBM 218 the one or more user utterances so that the CBM 218 does not have to separately ask for a servicing intent if the one or more user utterances include or can be mapped to a servicing intent token (see block 512). Additionally, by receiving the one or more user utterances, the CBM 218 receives context from the conversation the user had with the IVR model 220 or a customer representative agent (via phone) thereby reducing the amount of times the user has to repeat herself. Although different from blocks 410, 414, and 418, which describe generating and transmitting authentication and servicing into tokens to the AI chatbot model, transmitting the one or more user utterances in block 510 may achieve one or more of the advantages for both the customer and system 100 as described with respect to those blocks.

In block 510, the method 500 includes transcribing the one or more user utterances. For example, the dialogue management system 122 may convert the one or more user utterances into text that can be processed by other components of the system 100. In some embodiments, the dialogue management system 122 converts a voice recording of the one or more user utterances and transcribes that to text. In other embodiments, the system 100 includes a separate speech-to-text system (not shown) in communication with the dialogue management system 122 that transcribes the one or more user utterances.

In block 512, the method 500 includes mapping the transcribed one or more user utterances to one of a plurality of stored servicing intent tokens as similarly described with respect to block 420. For example, the transcribed one or more utterances may be compared to a plurality of stored servicing intent tokens. If the transcribed one or more user utterances matches (e.g., beyond a predetermined confidence threshold) one stored servicing intent tokens of the plurality of stored servicing intent tokens, then the dialogue management system 122 will have generated a serving intent token. The servicing intent token is recognizable by the AI chatbot model (e.g., CBM 218).

Sometimes, one or more user utterances cannot be mapped to a servicing intent token because the transcribed one or more user utterances does not match a stored servicing intent token of the plurality of servicing intent tokens beyond a predetermined threshold (e.g., 80%). Thus, in some embodiments, the dialogue management system 122 may determine whether the transcribed one or more user utterances was mapped to a servicing intent token. When the dialogue management system 122 determines that the transcribed one or more user utterances was not mapped to a servicing intent token, the dialogue management system 122 may prompt the user, via the phone call, for more information surrounding the purpose for the call. For example, the dialogue management system in conjunction with the NLP system 124 may generate a prompt that states "What would you like to accomplish?" or "What is the purpose for your call?" In other embodiments, when the customer or user is speaking with a human agent associated with a customer representative device 150, the dialogue management system 122 may transmit a prompt to the customer representative device to instruct the human agent to ask the user for more information surrounding the purpose for the call. The method would then move to block 504 and repeat at least blocks 504, 506, 510, 512. The dialogue management system 122 may not need to generate a new API call to the AI chatbot model, in block 508, if the API call is still active.

In block 514, the method 500 includes transmitting a message to the user device 102 via an AI chat session as similarly described with respect to block 422. For example, the dialogue management system 122 may via CBM 218 transmit a welcome message to the user device 102 and/or select the messaging channel as similarly described with respect to block 422.

In optional block 516, the method 500 may include transmitting a voice message, via the IVR model 220 and via the phone call, indicating that the AI chat session is available as similarly described with respect to block 424. For example, the voice message may state "The chat session is available." In some embodiments, the method 500 may include providing a customer representative device 150 with a prompt that the customer's (or user's) AI chat session is available. The customer representative can then inform the customer via the phone call that the AI chat session is available.

Although not shown, the method may also include transmitting, via the AI chat session using CBM 218, an answer to the user device 102 based on the servicing intent in lieu of or in addition to providing the welcome message and/or the voice message. The answer may include, for example, providing the user device 102 with their requested account balance. Other answers may include providing the user of the user device 102 with their requested recent transactions or providing the user of the user device 102 with an answer as to why a recent transaction was declined (e.g., the transaction was made in a foreign country). The method may include storing text-based interactions or voice-based interaction (e.g., a recording) comprising the answer in customer information database 216 or database 128. In some embodiments, the answer includes a text-based deep link that allows the user device 102 to perform an action in a mobile application or a web browser based on the servicing intent and without additional authentication. For example, a user of a user device 102, who has a servicing intent of requesting her account balance, may select a deep link, sent to the user device via an SMS messaging channel, which opens to the user's account balance on a banking website without the user needing to enter a username and password.

Figure 6A:
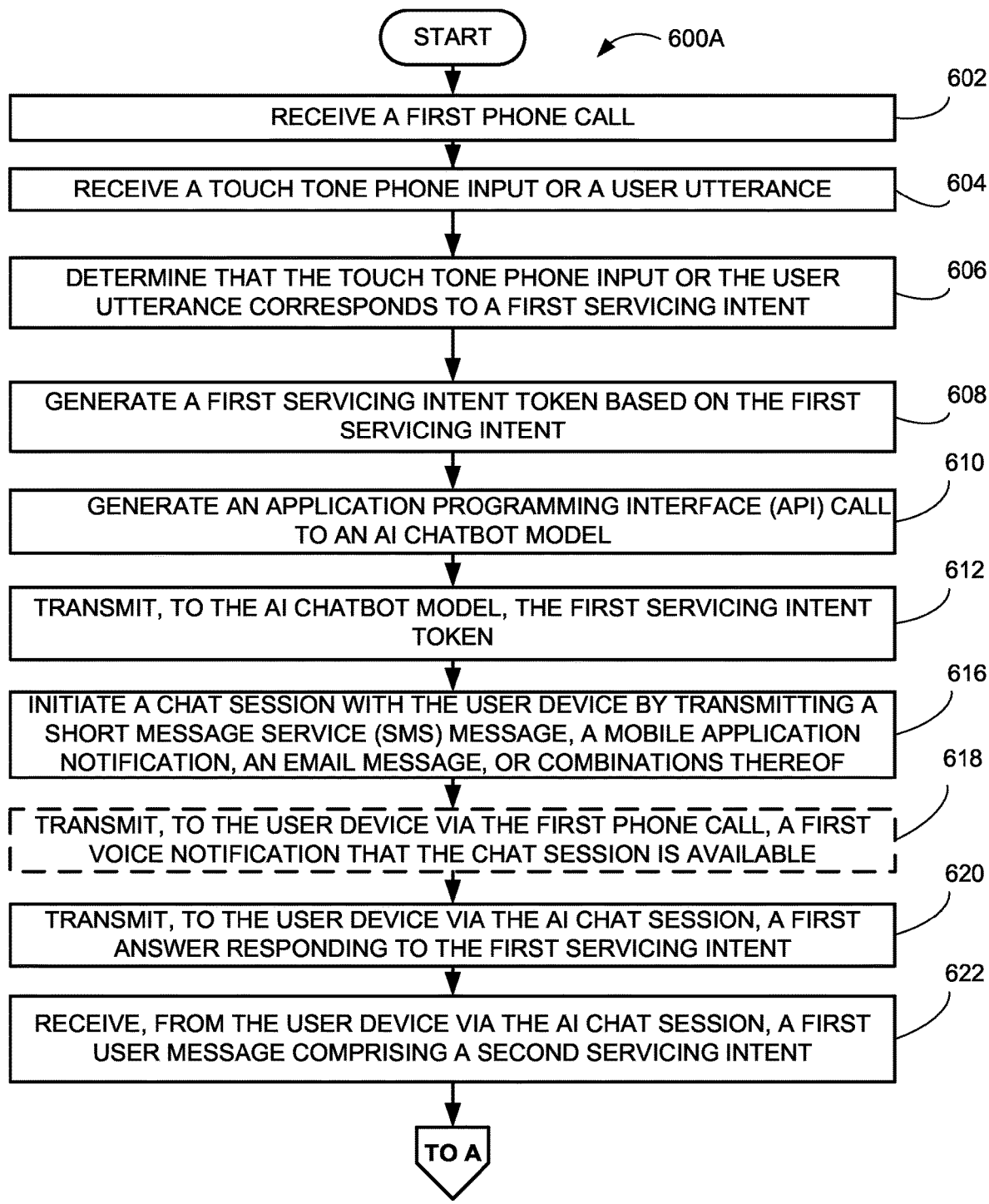
FIG. 6A and FIG. 6B are flowcharts of yet another method 600 for transitioning an IVR call to an AI chat session and back to an IVR call.
Figure 6B:
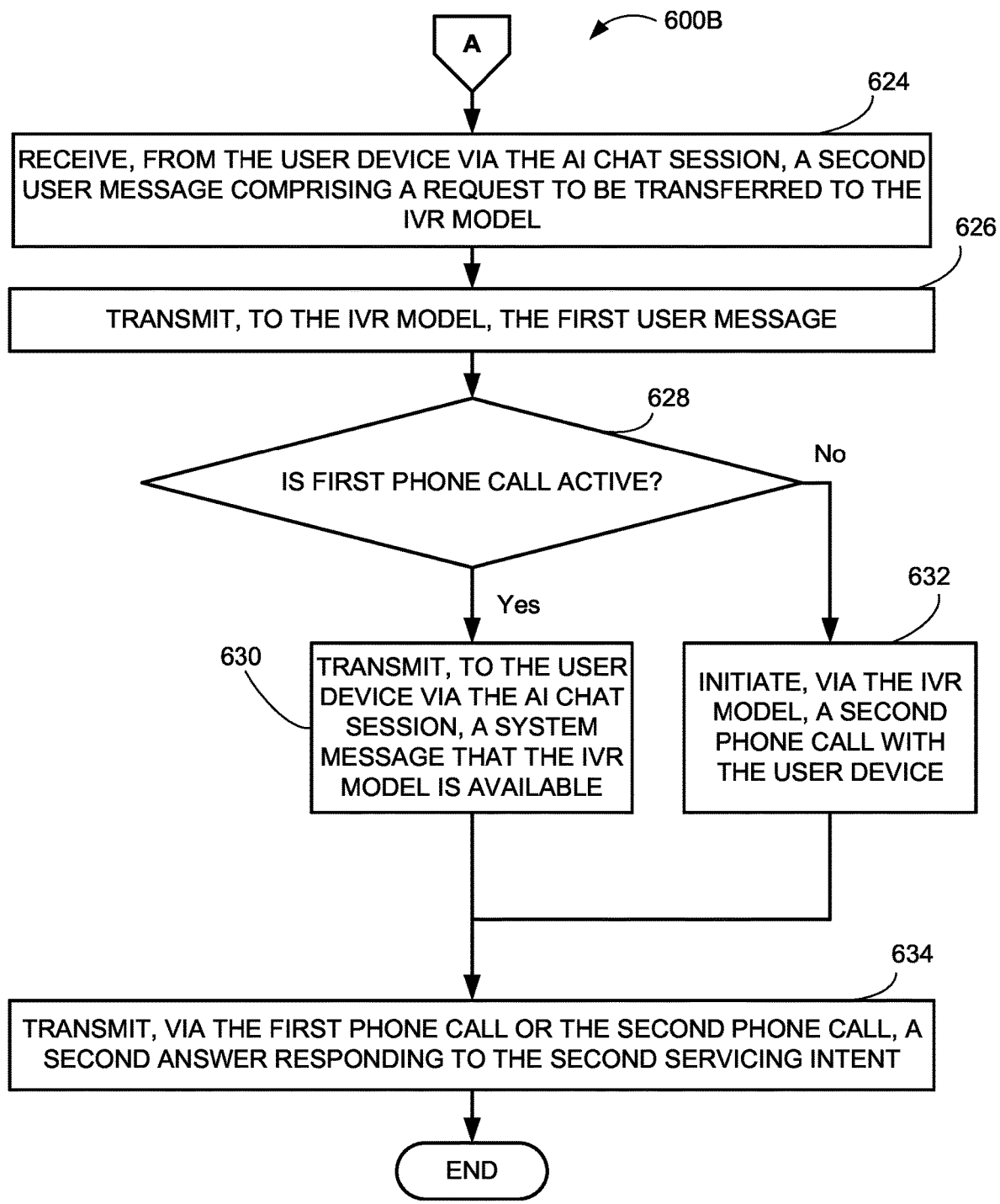

FIG. 6A and FIG. 6B are flowcharts of a method 600 for transitioning an IVR call to an AI chat session and back to an IVR call. In certain example implementations, one or more of the steps of the method 600 may be performed by dialogue management system 122 using processor 202 to execute memory 206. In some embodiments, steps of method 600 may be delegated to other components, such as the user device 102, and/or components associated with the system 100. Following method 600, the system 100 may reestablish an IVR call with user device 102.

In block 602, the method 600 includes receiving, from a user device 102 associated with a user and a phone number, a first phone call as similarly described with respect to block 402. For example, the user of the user device 102 may dial a phone number associated with system 100 thereby connecting with an IVR model 220 of the dialogue management system 122.

In block 604, the method 600 includes receiving a touch tone phone input or a user utterance as similarly described with respect to block 406. In some embodiments, the dialogue management system 122 may receive an option selected by the user of user device 102 from a touch tone menu. For example, the user of user device 102 presses 2 on a touch tone menu indicating that they are requesting an account balance, which is received by the dialogue management system 122. In some embodiments, the dialogue management system 122 may receive a user utterance such as spoken words (e.g., "I'd like my account balance.").

In block 606, the method 600 includes determining that the touch tone phone input or the user utterance corresponds to a first serving intent as similarly described with respect to blocks 412 and 414. For example, the dialogue management system 122 may map the touch tone phone input selected menu option (e.g., press 1 for account balance) to a stored servicing intent of the plurality of stored servicing intents. Alternatively, the dialogue management system 122 may map the user utterance to a stored servicing intent of the plurality of stored servicing intents as similarly described with respect to block 420. The plurality of stored servicing intents may be stored in customer information database 216 or database 128.

In block 608, the method 600 includes generating a first servicing intent token based on the first servicing intent as similarly described with respect to block 414. The dialogue management system 122 may generate the first servicing intent token to characterize the user's first intent based on the one or more utterances. As will be described later and in a similar fashion to that described with respect to block 418, this serving intent token may be transferred to other models (or services) (e.g., an AI chatbot model) as proof that the dialogue management system 122 has already received the user's intent.

In block 610, the method 600 includes generating an application programming interface (API) call to an AI chatbot model as similarly described with respect to block 416. For example, the dialogue management system 122 may call its CBM 218 in order to prepare to transmit information to the CBM 218.

In block 612, the method 600 includes transmitting, to the AI chatbot model, the first servicing intent token as similarly described with respect to block 418. For example, the dialogue management system 122 may transmit to the CBM 218 the first servicing intent token so that the user of the user device 102 does not have to explain the reason for their call again to the CBM 218 (i.e., the AI chatbot model).

In block 616, the method 600 includes transmitting, via an AI chat session, a short message service (SMS) message, a mobile application notification (or message), an email message (the email message may be the AI chat session or may contain a deep link (HyperText Transfer Protocol (HTTP)) to a web-based AI chat session), a web-based AI chat session message, or combinations thereof as similarly described with respect to block 422.

In optional block 618, the method 600 may include transmitting, to the user device 102 via the first phone call, a first voice notification that the AI chat session is available as similarly described with respect to block 424. For example, the dialogue management system 122, via IVR model 220, may "speak" to the user via the user device 102 by saying "The chat session is available."

In block 620, the method 600 includes transmitting, to the user device 102 via the AI chat session, a first answer responding to the first servicing intent. The system 100 may transmit the answer in lieu of or in addition to providing a welcome message and/or the voice message (e.g., transmitting the first answer in block 620 may serve as the message in block 616). For example, the first answer could be an account balance in response to first servicing intent being a request for an account balance. The first answer may be in the form of a SMS message, a mobile application notification or message, or an online AI chat session message via a website.

In block 622, the method 600 includes receiving, from the user device 102 via the AI chat session, a first user message comprising (or that the system 100 determines comprises) a second servicing intent. For example, the dialogue management system 122 may receive a text-based message (via a SMS messaging channel, via a mobile application messaging channel, or via an online website AI chat session message) that request for the user's three most recent transactions and determine that the second servicing intent relates to providing recent transactions in contrast to a different first servicing intent.

In block 624, the method 600 includes receiving from the user device 122 via the AI chat session, a second user message comprising a request to be transferred to the IVR model. The dialogue management system 122 may receive a text-based message (e.g., an SMS message, a mobile application message, or an online AI chat session message) requesting to be transferred to voice. The message may simply state "I'd like to be transferred to a voice system" or something to that affect.

In block 626, the method 600 includes transmitting, to the IVR model 220, the first user message. For example, the dialogue management system 122 provides the IVR model 220 with the first message received by the user via the AI chat session. By providing the IVR model 220 with the first message, the IVR model is aware of the second servicing intent and can answer the user's request associated with the second servicing intent without requiring the user to repeat herself about the second servicing intent. In some embodiments, the method 600 may include iteratively transmitting additional messages received by the dialogue management system 122 from the user device 102. These additional messages may provide context toward the second servicing intent and/or an additional servicing intent.

In block 628, the method 600 includes determining whether the first phone call is active. For example, the dialogue management system 122 may determine whether the user is still on the line with respect to the first phone call or whether the user hung up after transitioning to the AI chat session.

In block 630, the method 600 includes responsive to determining that the first phone call is active, transmitting, to the user device 102 via the AI chat session, a system message that the IVR model is available in similar fashion to that described with respect to the message indicating that the AI chat session is available in block 424, only in reverse. For example, the response management device 122 may send a text-based message to the user device 102 via an AI chat session (e.g., a SMS AI chat session, a mobile application AI chat session, or an online/website AI chat session) stating "Your voice session is available."

In block 632, the method 600 includes responsive to determining that the phone call is not active, initiating via the IVR model 220, a second phone call with the user device by calling the phone number associated with the user and used for the first phone call. The dialogue management system 122 may store the user device phone number 122 from the first phone call and associate it with the user in database 128 or customer information database 216. Since the phone number has been stored, the dialogue management system 122 via the IVR model 220 may simply call the user device 122 based on the stored phone number. Alternatively, the system 100 may store a preferred phone number for the user and initiate the second phone call with the preferred phone number regardless of whether that phone number was used during the first phone call.

In block 634, the method 600 includes transmitting, via the first phone call or the second phone call, a second answer responding to the second servicing intent. In some embodiments, the dialogue management system 122 via the IVR model 220 may "speak" the second answer. For example, the dialogue management system 122 may speak the last three transactions made on a particular credit card if the second servicing intent request for the last three transactions made on a particular credit card.

Figure 7:
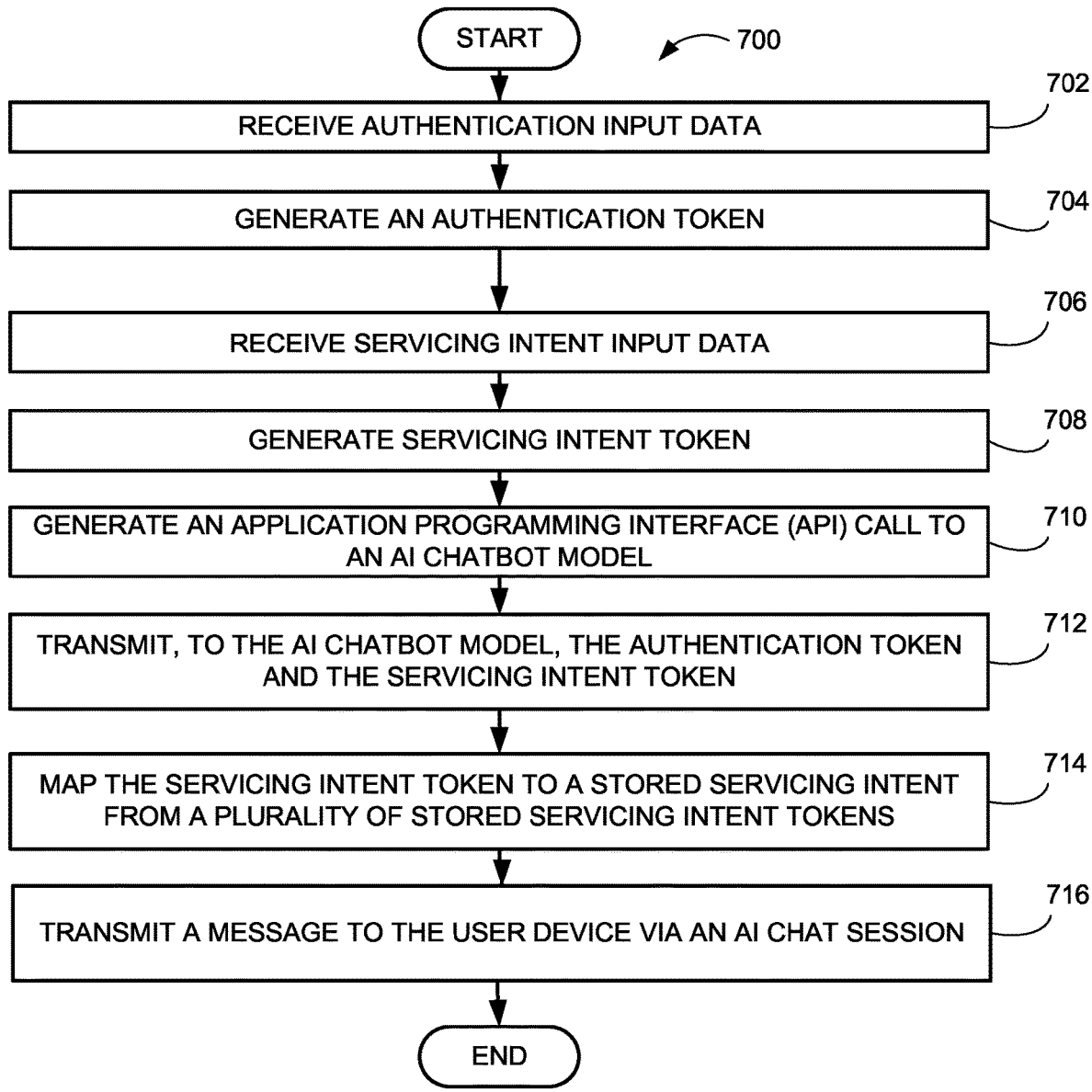
FIG. 7 is a flowchart of a method 700 for transitioning in-person servicing to an AI chat session.

FIG. 7 is a flowchart of a method 700 for transitioning in-person servicing to an AI chat session. In certain example implementations, one or more of the steps of the method 700 may be performed by dialogue management system 122 using processor 202 to execute memory 206 or the NLP system 124. In some embodiments, steps of method 700 may be delegated to other components, such as the user device 102, and/or components associated with the system 100. Following method 700, the system 100 may transmit a message to output by or for display by, for example, user device 102.

In block 702, the method 700 includes receiving authentication input data. In some embodiments, a customer representative may authenticate a customer by verifying the customer's identification (e.g., passport or driver's license). For example, a customer may walk into a brick-and-mortar location (e.g., a bank, café, retail store, hospital, or doctor's office) hand over his driver's license to a customer representative who authenticates that the customer is the same person in the driver's license. The customer representative may input authentication data into the customer representative device 150, which is transmitted to the dialogue management system 122. In other words, the dialogue management system 122 receives the authentication input data from the customer representative device 150.

In block 704, the method 700 includes generating an authentication token based on the authentication input data. The authentication system 116 may generate an authentication token capable of being transferred to an AI chatbot model. In some embodiments, the authentication system 116 may generating the authentication token in response to being called by the dialogue management system 122 via the API server 126.

In block 706, the method 700 includes receiving servicing intent input data. For example, a customer may describe the reason for his visit to the brick-and-mortar location. The customer representative may summarize, categorize, or otherwise place the customer's reason (in simplified formed) into a service intent and input related service intent data into to customer representative device 150, which is transmitted to the dialogue management system 122.

In block 708, the method 700 includes generating a servicing intent token based on the servicing intent input data. The dialogue management system 122 may generate the servicing intent token capable of being transferred to an AI chatbot model.

In block 710, the method 700 includes generating an API call to the AI chatbot model. For example, the dialogue management system 122 may call its CBM 218 in order to prepare to transmit information to the CBM 218. The generation of the API call to the AI chatbot model may be based upon a customer representative's trigger input into the customer representative device 150. During the conversation with the customer, the customer may request or the customer representative may suggest transferring to AI chat session (e.g., an SMS AI chat session, a mobile application text-based AI chat session, email AI chat session, web-based AI chat session, a phone call AI chat session, a mobile application voice-based AI chat session, a smart speaker application voice-based AI chat session, or a vehicle entertainment system application voice-based AI chat session). Thus, the customer representative may trigger the transfer by input trigger input data into the customer representative device 150.

In block 712, the method 700 includes transmitting, to the AI chatbot model, the authentication token and the servicing intent token. For example, the dialogue management system 122 may transmit the authentication token to the CBM 218 so that the CBM 218 does not have to separately authenticate the user of user device 102. That is, once a user enters an AI chat session, the user will not need to repeat identification and authentication steps that were already performed. Additionally, the dialogue management system 122 may transmit to the CBM 218 the servicing intent token so that the user of the user device 102 does not have to explain the reason for walking into the brick-and-mortar to the CBM 218 (i.e., the AI chatbot model). This provides an expedited user experience while not occupying system resources (e.g., in this case the CBM 218) to repeat identification, authentication, and/or service intent identification steps that were previously performed.

In block 714, the method 700 includes mapping the servicing intent token to a stored servicing intent token from a plurality of stored servicing intent tokens. For example, the dialogue management system 122 may map the servicing intent token to a stored servicing intent of the plurality of stored servicing intents. The plurality of stored servicing intents may be stored in customer information database 216 or database 128, and may be associated with a particular model (e.g., in this case the AI chatbot model).

In block 716, the method 700 include transmitting a message to the user device via an AI chat session. The AI chat session may be is text-based or voice-based. In some embodiments, the dialogue management system 122 may transmit an SMS message, a mobile application notification or message, an email message, an email message containing a link (e.g., a deep link) to a web-based AI chat session, a voice message (e.g., via the mobile application (e.g., smart phone application, tablet application, wearable device application (e.g., smart watch application), augmented/virtual reality device application)), via a telephone call, via a smart speaker application, or via a vehicle entertainment system application). In some embodiments, the dialogue management system 122 may select one or more particular messaging channels to send the message based on stored implicit preferences, explicit preferences, the type of information that the dialogue management system 122 is providing (e.g., based on an optimal channel for the specific intent), machine learning prediction of the optimal channel, or combinations thereof.

The implicit preference may correspond to how a user has communicated in the past with the AI chatbot model. The user's implicit preference may be stored in database 128 or customer information database 216, which may be accessed by the dialogue management system 122. For example, the dialogue management system 122 may access a user's implicit preferences such as the majority of the user's communication with the AI chatbot model has been through SMS messaging. Then the dialogue management system 122 may, based on the implicit preference that the user typically communicates with AI chatbot model through SMS messaging, select SMS messaging to transmit a welcome message to the user or an answer to user's servicing intent.

The explicit preference may correspond to a user selection for a particular channel of communication. For example, the user may convey to a customer representative via the phone or at a brick-and-mortar location an explicit preference for communicating via a mobile application text-based messaging. This may be done unprompted or after being prompted by the customer representative as to what communication channel the user chooses. The customer representative may enter this information into the customer representative device 150, which is transmitted to the dialogue management system 122. In other words, the dialogue management system 122 may receive the explicit preference input data from the customer representative device 150. In some embodiment's the explicit preference overrides any implicit preference or type of information to be provided considerations. Thus, if the user has an explicit preference to communicate via a mobile application messaging and the user has an implicit preference to communicate over SMS messaging, the dialogue management system 122 would select the communication channel that corresponds to the user's explicit preference. In other words, the dialogue management system 122 will determine whether it has received an explicit preference regarding the current session and if not, the dialogue management system 122 will base its selection on the user's implicit preference and/or the type of information that the user is providing.

The dialogue management system 122 may select a particular channel based on the type of information that the system is providing. For example, if servicing intent is a request for three most recent transactions on a credit card or checking account, then the dialogue management system 122 may select a visual communication medium (e.g., SMS messaging channel, mobile application messaging channel, email messaging channel, web-based messaging channel) over a voice-based communication medium (e.g., a AI chatbot phone call and an AI chatbot mobile application voice communication) because it is more difficult to convey such information over voice. Although the user explicit preferences may trump the type of communication considerations, the type of information considerations may trump a user's implicit preferences. For example, if a user typically communicates with the AI chatbot model via a phone call but the servicing intent is a request for an action that is difficult to convey via voice (e.g., a request for an account balance, recent transactions), the dialogue management system 122 may select a visual (text-based) AI chatbot model (e.g., select SMS messaging because the user's second most used communication medium with the AI chatbot system).

If there are no implicit preferences, explicit preferences, then the dialogue management system 122 may default to selecting SMS messaging or a mobile application messaging if the user device has the mobile application installed.

Figure 8:
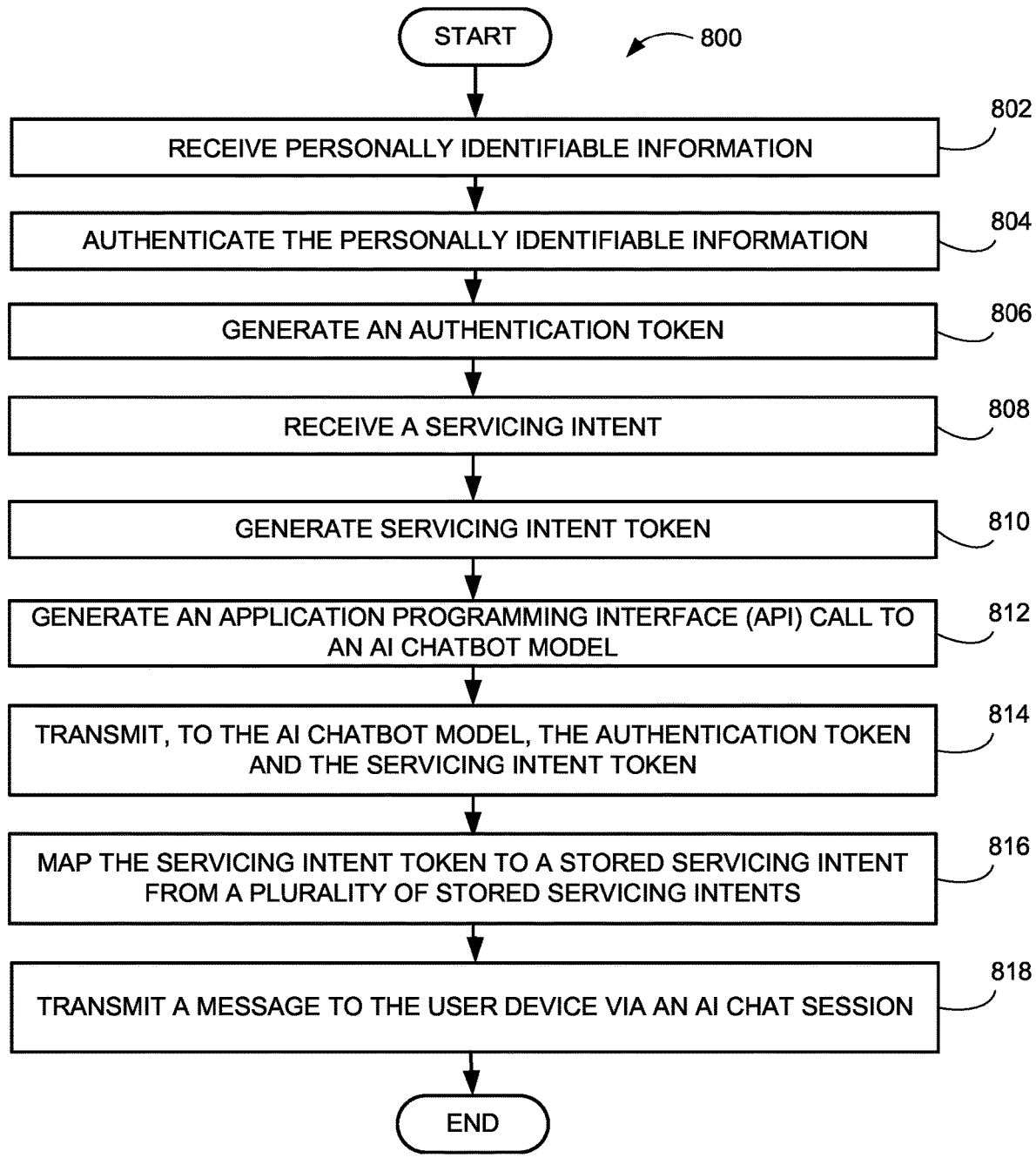
FIG. 8 is a flowchart of another method 800 for transitioning in-person servicing at a user interaction device to an AI chat session.

FIG. 8 is a flowchart of a method 800 for transitioning in-person servicing to an AI chat session. In certain example implementations, one or more of the steps of the method 800 may be performed by dialogue management system 122 using processor 202 to execute memory 206 or the NLP system 124. In some embodiments, steps of method 800 may be delegated to other components, such as the user device 102, and/or components associated with the system 100. Following method 800, the system 100 may transmit a message to output by or for display by, for example, user device 102.

In block 802, the method 800 includes receive personally identifiable information from a user interaction device 140 or user device 102. For example, a user can walk into a brick-and-mortar store and interact with a user interaction device 140 (e.g., a tablet computer or a kiosk computing device), which may prompt the user to enter personally identifiable information. The user can enter his personally identifiable information into the user interaction device 140, which is then received by the dialogue management system 122.

In block 804, the method 800 includes authenticating the personally identifiable information or at least a portion thereof. For example, the authentication system 116 may compare the received personally identifiable with information associated with the identified user that is stored in customer information database 216 or database 128 to determine if the information matches (e.g., beyond a predetermined confidence threshold). If the received personally identifiable information matches the stored personally identifiable information, then the authentication system 126 authenticates the personally identifiable information. If, however, the received personally identifiable information does not match any stored personally identifiable information associated with the identified user, the dialogue management system 122 may, via the user interaction device 140, request or prompt the user for additional personally identifiable information or direct the user (e.g., via the user device 102) to register with the dialogue management system 122 (e.g., online, via a related mobile application, or at a merchant location associated with the system 100). Alternatively, if the received personally identifiable information does not match any stored personally identifiable information associated with the identified user, the dialogue management system 122 may, via the user interaction device 140, request to update some personally identifiable information online or via a related mobile application. It is contemplated that the system 100 may have built in password recovery and reset features (e.g., with security questions) to allow the user to authenticate himself even when the received personally identifiable information does not match any stored personally identifiable information associated with the identified user. The system 100 may also impose limits on the number of attempts or time duration that the user may provide personally identifiable information and/or attempt to recover or reset his password, and such imposed limits may be preset based on a security level associated with the user's account and/or preferences provided by the user in advance of the interaction with the user interaction device 140.

In block 806, the method 800 includes generating an authentication token in response to authenticating the personally identifiable information. Block 410 is similar to block 806, thus the description of block 410 is incorporated by reference herein.

In block 808, the method 800 includes receiving a servicing intent. Block 412 is similar to block 808, thus the description of block 412 is incorporated by reference herein.

In block 810, the method 800 includes generating a servicing intent token. Block 414 is similar to block 810, thus the description of block 414 is incorporated by reference herein.

In block 812, the method 800 includes generating an API call to an AI chatbot model. Block 416 is similar to block 812, thus the description of block 416 is incorporated by reference herein.

In block 814, the method 800 includes transmitting, to the AI chatbot model, the authentication token and the servicing intent token. Block 418 is similar to block 814, thus the description of block 418 is incorporated by reference herein.

In block 816, the method 800 includes mapping the servicing intent token to a stored servicing intent from a plurality of stored servicing intents. Block 420 is similar to block 816, thus the description of block 420 is incorporated by reference herein.

In block 818, the method 800 includes transmitting a message to the user device via an AI chat session. Block 422 is similar to block 818, thus the description of block 422 is incorporated by reference herein.

Figure 9:
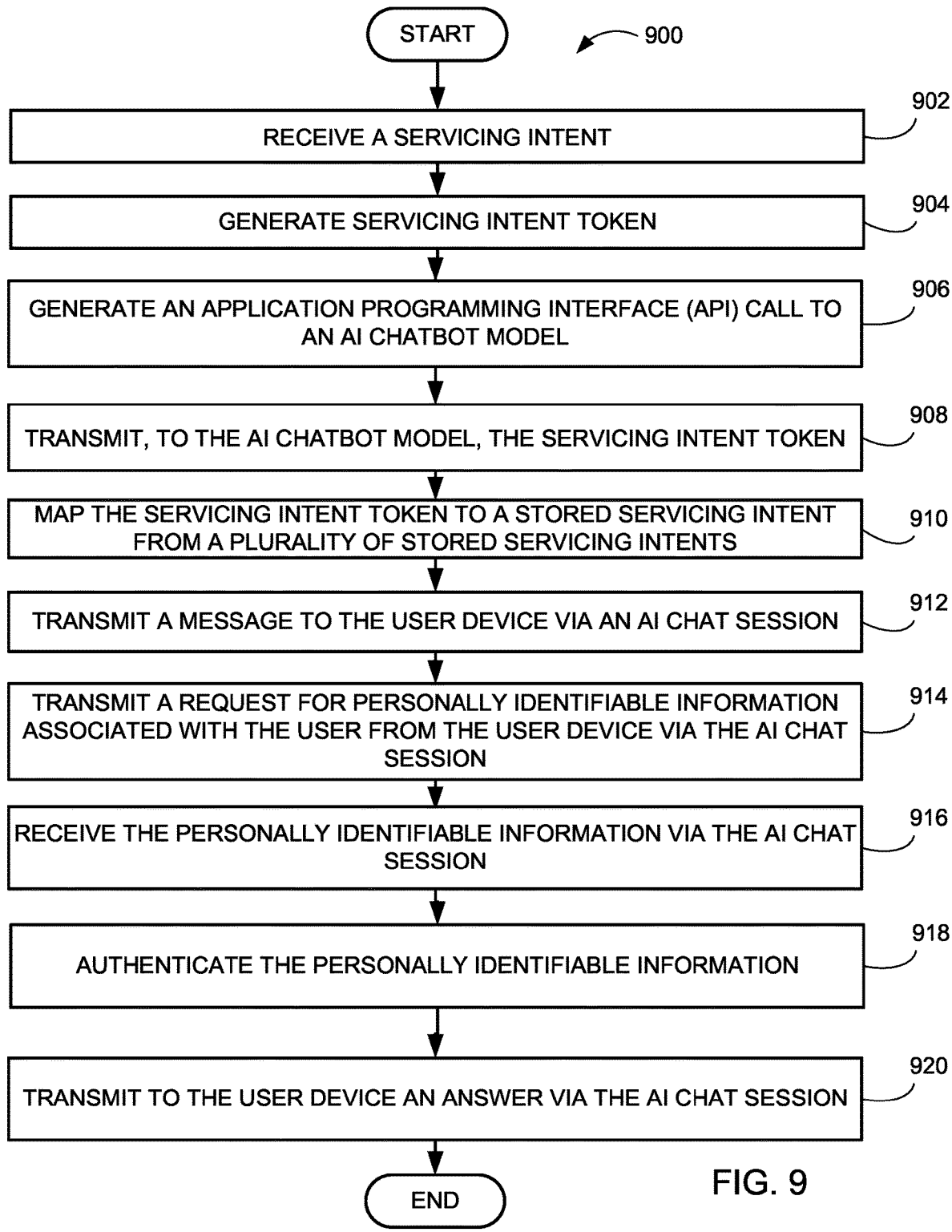
FIG. 9 is a flowchart of another method 900 for transitioning unauthenticated user to AI chat session and authenticating the user in the AI chat session.

FIG. 9 is a flowchart of a method 900 for transitioning unauthenticated user to AI chat session and authenticating the user in the AI chat session. In certain example implementations, one or more of the steps of the method 900 may be performed by dialogue management system 122 using processor 202 to execute memory 206 or the NLP system 124. In some embodiments, steps of method 900 may be delegated to other components, such as the user device 102, and/or components associated with the system 100. Following method 900, the system 100 may transmit a message to output by or for display by, for example, user device 102.

In block 902, the method 900 includes receiving a servicing intent. That servicing intent may be received via a phone call, through a user interaction device 140, or through a customer representative device 150. Regardless, in one example, the servicing intent may be requesting to transfer funds from one account to another account. Blocks 412, 706, and 808 are similar to block 902, thus the description of blocks 412, 706, and 808 are incorporated by reference herein.

In block 904, the method 900 includes generating a servicing intent token based on the servicing intent. Blocks 414, 708, and 810 are similar to block 904, thus the description of blocks 414, 708, and 810 are incorporated by reference herein.

In block 906, the method 900 include generating an API call to an AI chatbot model. Blocks 416, 710, and 812 are similar to block 906, thus the description of blocks 416, 710, and 812 are incorporated by reference herein.

In block 908, the method 900 includes transmitting, to the AI chatbot model, the servicing intent token. The dialogue management system 122 may transmit to the CBM 218 the servicing intent token so that the user of the user device 102 does not have to explain the reason for walking into the brick-and-mortar to the CBM 218 (i.e., the AI chatbot model). This provides an expedited user experience while not occupying system resources (e.g., in this case the CBM 218) to repeat identification, authentication, and/or service intent identification steps that were previously performed by another related model (e.g., in this example the IVR model).

In block 910, the method 900 includes mapping the servicing intent token to a stored servicing intent from a plurality of stored servicing intents. The dialogue management 122 may map the servicing intent token to a stored servicing intent of the plurality of stored servicing intents. In this fashion, the servicing intent token recognized in one model (e.g., an IVR model, interaction with a customer service agent, or interaction with a user interaction device) may be mapped to a similar but model-specific stored servicing intent that can be used by another related model (e.g., the AI chatbot model).

In block 912, the method 900 includes transmitting a message to the user device via an AI chat session. Blocks 422, 716, and 818 are similar to block 912, thus the description of blocks 422, 716, and 818 are incorporated by reference herein.

In block 914, the method 900 includes transmitting a request for personally identifiable information associated with the user from the user device via the AI chat session whether it be an SMS AI chat session, a mobile application text-based AI chat session, email AI chat session, web-based AI chat session, a phone call AI chat session, a mobile application voice-based AI chat session, a smart speaker application voice-based AI chat session, or a vehicle entertainment system application voice-based AI chat session.

In block 916, the method 900 includes receiving the personally identifiable information via the AI chat session. The dialogue management system 122 receives the personally identifiable information via the AI chat session whether it be an SMS AI chat session, a mobile application text-based AI chat session, email AI chat session, web-based AI chat session, a phone call AI chat session, and a mobile application voice-based AI chat session. If the AI chat session is text-based, then the dialogue management system 122 may simply receive and process the personally identifiable information. If the AI chat session is voice based (e.g., a phone call AI chat session or a mobile application voice-based AI chat session), the dialogue management system 122 may receive one or more user utterances which may be transcribed by NLP system 124 and interpreted as personally identifiable information. Although not shown, in some embodiments, the dialogue management system 122 may determine whether the received personally identifiable information is complete. If the received personally identifiable information is incomplete (e.g., a user only supplies her first name), the dialogue management system 122 may iteratively request for additional personally identifiable information (e.g., a last name and a birthday) until it determines that received personally indefinable information is sufficient or complete to successfully identify the user via the system 100. If the received personally identifiable information is sufficient or complete to successfully identify the user, the dialogue management system 122 may move to block 918 to authenticate the personally identifiable information and the additional personally identifiable information.

In block 918, the method 900 includes authenticating the personally identifiable information via the AI chat session. Blocks 408 and 804 are similar to block 918, thus the description of blocks 408 and 804 are incorporated by reference herein. However, unlike blocks 408 and 804, the dialogue management system 122 is authenticating the personally identifiable information via the AI chatbot model (i.e., CBM 218).

In block 920, the method 900 includes transmitting to the user device an answer via the AI chat session. Because the user is now authenticated, the dialogue management system 122 may transmit to the user device an answer to the servicing intent. For example, if the servicing intent is to obtain an account balance, then the dialogue management system 122 may transmit the user's account balance via the AI chat session whether it be an SMS AI chat session, a mobile application text-based AI chat session, email AI chat session, web-based AI chat session, an phone call AI chat session, and a mobile application voice-based AI chat session.

Figure 10A:
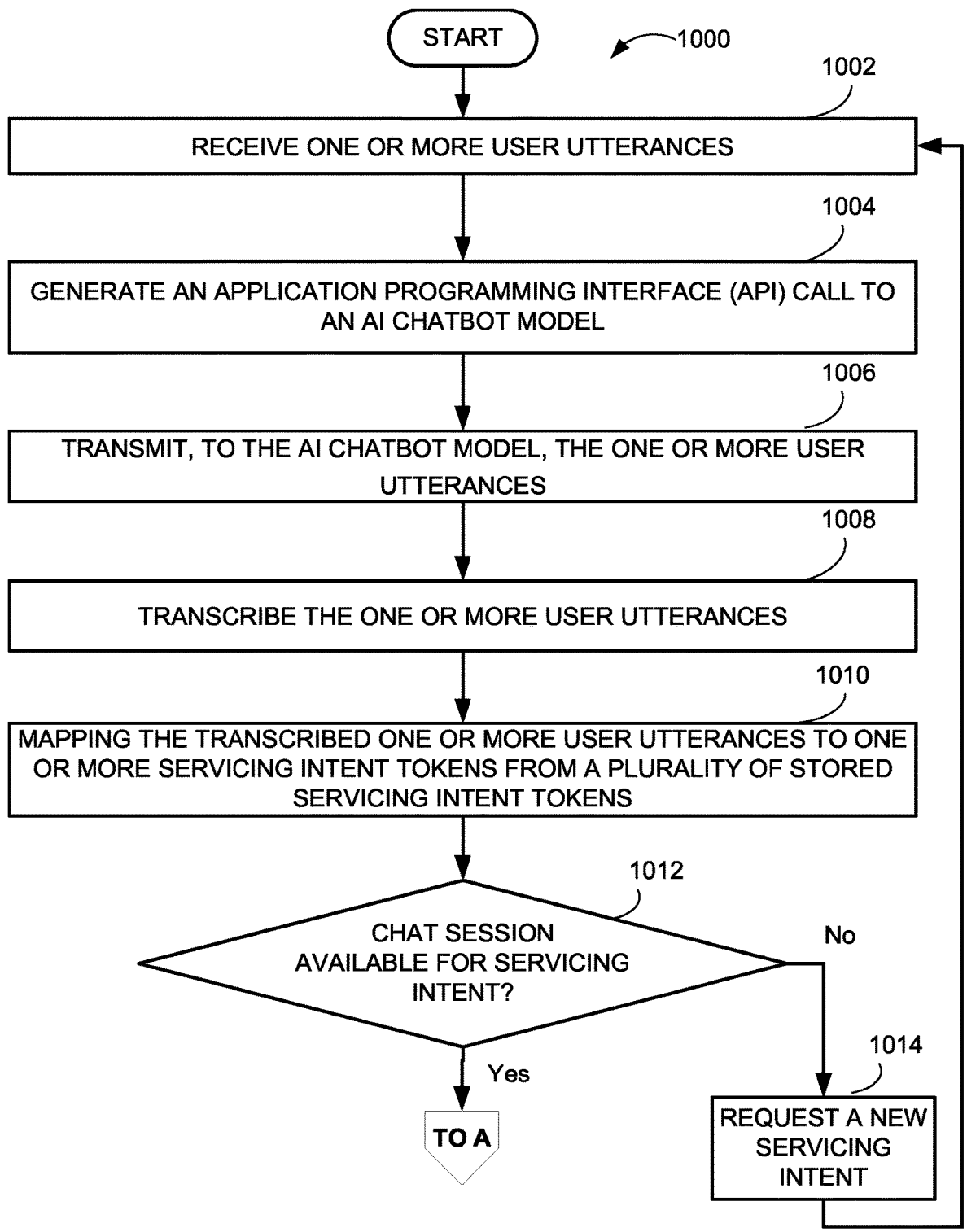
FIG. 10A and FIG. 10B are flowcharts of yet another method 1000 for transitioning a user to a selected messaging channel of an AI chat session.
Figure 10B:
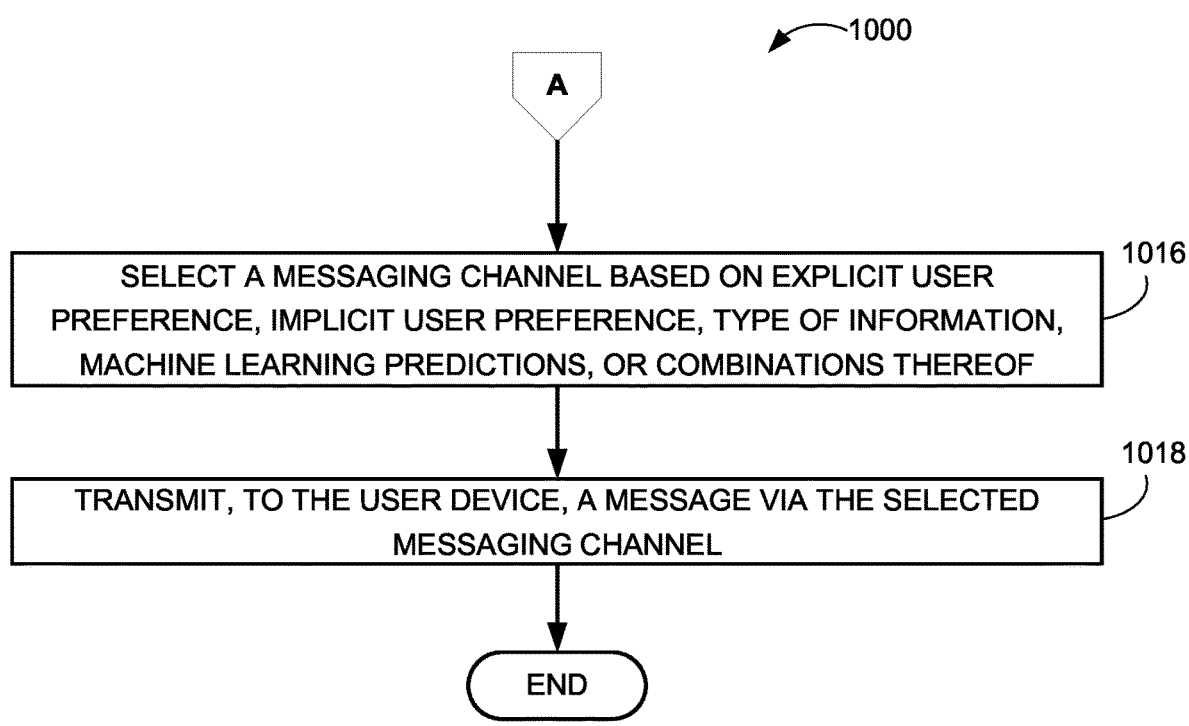

FIGS. 10A and 10B are flowcharts of a method 1000 for transitioning a user to a selected messaging channel of an AI chat session. In certain example implementations, one or more of the steps of the method 1000 may be performed by dialogue management system 122 using processor 202 to execute memory 206 or the NLP system 124. In some embodiments, steps of method 1000 may be delegated to other components, such as the user device 102, and/or components associated with the system 100. Following method 1000, the system 100 may transmit a message to output by or for display by, for example, user device 102.

In block 1002, the method 1000 includes receiving one or more user utterances. For example, a user may speak into the user device 102 "What is my account balance?," which may be received by the dialogue management system 122 via a phone call. In some embodiments, the one or more user utterances are recorded in-person or over the telephone and then transmitted to the dialogue management system 122.

In block 1004, the method 1000 includes generating an API call to an AI chatbot model. Blocks 416, 506, 610, 710, 812, 906 are similar to block 1004, thus blocks 416, 506, 610, 710, 812, 906 description is incorporated by reference herein.

In block 1006, the method 1000 includes transmitting, to the AI chatbot model, the one or more user utterances. The dialogue management system 122 may transmit, to the AI chatbot model (CBM 218) the one or more user utterances.

In block 1008, the method 1000, includes transcribing the one or more user utterances via the AI chatbot model. The NLP system 124 and the AI chatbot model may transcribe the one or more user utterances.

In block 1010, the method 1000 includes mapping the transcribed one or more user utterances to one or more servicing intent tokens from a plurality of stored servicing intent tokens as similarly described with respect to blocks 420 and 512 except that the AI chatbot model and the NLP system 124 may be involved in the mapping process.

In determination block 1012, the method 1000 includes determining whether an AI chat session is available for the servicing intent. Assuming that the dialogue management system 122 was able to map the one or more user utterances to one or more servicing intent tokens from a plurality of stored servicing intent tokens, the dialogue management system 122 may determine whether an AI chat session is available for the particular one or more servicing intent tokens. The dialogue management system 122 may compare to the one or more servicing intent tokens to a list of stored servicing intent tokens that the AI chatbot model cannot handle due to security, policy, or other reasons. For example, a user may have a servicing intent to transfer a large sum of money (e.g., $20,000) from a bank associated with the AI chatbot model to a bank that is not associated with the AI chatbot model. However, the AI chatbot model may have a policy transfer limit of $5,000 to outside banks via the AI chatbot model to avoid fraudulent transfers. As another example, the AI chatbot model may not be able to wire money of $10,000 or more to a foreign company or bank to avoid fraud. As a further example, the AI chatbot model may not be able to cancel a subscription, credit card, or bank account due to policy reasons (e.g., the company wants you to speak with a person to convince you to not cancel before canceling).

In response to determining that an AI chat session is not available for the servicing intent, the method 1000, in block 1014, includes requesting a new servicing intent. In an alternative embodiment, in response to determining that an AI chat session is not available for the servicing intent, the method 1000, includes recommend that the customer resume connecting with or connect with a customer representative. The dialogue management system 122 may prompt the user, via a new phone call or an already established phone call, for more information surrounding the user's purpose for calling. For example, the dialogue management system in conjunction with the NLP system 124 may generate a prompt that states "What would you like to accomplish?" or "What is the purpose for your call?" In other embodiments, when the customer or user is speaking with a human agent (in-person or over the phone) associated with a customer representative device 150, the dialogue management system 122 may transmit a prompt to the customer representative device to instruct the human agent to ask the user for more information surrounding the purpose for the call. The method would then move to block 1002 and repeat at least blocks 1002, 1006, 1008, 1010, and 1012. The dialogue management system 122 may not need to generate a new API call to the AI chatbot model, in block 1004, if the API call is still active.

In response to determining that an AI chat session is available for the serving intent, the method 1000, in block 1016, includes selecting a messaging channel (e.g., SMS messaging channel, mobile application messaging channel, email messaging channel, web-based messaging channel, an AI chatbot phone call and an AI chatbot mobile application voice communication, etc.) based on explicit user preferences (e.g., where the system receives the explicit user preference via one or more user utterances or the user selects a messaging channel in response to a prompt (verbal or textual or other display prompt) by the dialogue management system 122, which is received by the dialogue management system 122), implicit user preference (e.g., based on previous customer interactions is typically used when other information (e.g., explicit preferences) in not available), type of information the system is providing (e.g., based on an optimal channel for the specific intent), machine learning prediction of the optimal channel (e.g., when broader information is available such as implicit preferences, implicit preferences, contextual (e.g., type of information the system is providing), and other data related to the customer, or combinations thereof. In some embodiments, the dialogue management system 122 may simply select all available messaging channels to send a message based on specific requirements or customer need.

The implicit preference may correspond to how a user has communicated in the past with the AI chatbot model. The user's implicit preference may be stored in database 128 or customer information database 216, which may be accessed by the dialogue management system 122. For example, the dialogue management system 122 may access a user's implicit preferences such as the majority of the user's communication with the AI chatbot model has been through SMS messaging. Then the dialogue management system 122 may, based on the implicit preference that the user typically communicates with AI chatbot model through SMS messaging, select SMS messaging to transmit a welcome message to the user or an answer to user's servicing intent.

The explicit preference may correspond to a user selection for a particular channel of communication. For example, the user may convey to a customer representative via the phone or at a brick-and-mortar location an explicit preference for communicating via a mobile application text-based messaging. This may be done unprompted or after being prompted by the customer representative as to what communication channel the user chooses. The customer representative may enter this information into the customer representative device 150, which is transmitted to the dialogue management system 122. In other words, the dialogue management system 122 may receive the explicit preference input data from the customer representative device 150. In some embodiment's the explicit preference overrides any implicit preference or type of information to be provided considerations. Thus, if the user has an explicit preference to communicate via a mobile application messaging and the user has an implicit preference to communicate over SMS messaging, the dialogue management system 122 would select the communication channel that corresponds to the user's explicit preference. In other words, the dialogue management system 122 will determine whether it has received an explicit preference regarding the current session and if not, the dialogue management system 122 will base its selection on the user's implicit preference and/or the type of information that the user is providing.

The dialogue management system 122 may select a particular channel based on the type of information that the system is providing. For example, if servicing intent is a request for three most recent transactions on a credit card or checking account, then the dialogue management system 122 may select a visual communication medium (e.g., SMS messaging channel, mobile application messaging channel, email messaging channel, web-based messaging channel) over a voice-based communication medium (e.g., a AI chatbot phone call and an AI chatbot mobile application voice communication) because it is more difficult to convey such information over voice. Although the user explicit preferences may trump the type of communication considerations, the type of information considerations may trump a user's implicit preferences. For example, if a user typically communicates with the AI chatbot model via a phone call but the servicing intent is a request for an action that is difficult to convey via voice (e.g., a request for an account balance, recent transactions), the dialogue management system 122 may select a visual (text-based) AI chatbot model (e.g., select SMS messaging because the user's second most used communication medium with the AI chatbot system).

If there are no implicit preferences, explicit preferences, then the dialogue management system 122 may default to selecting SMS messaging, a mobile application text-based messaging if the user device has the mobile application installed, or a voice-based messaging (e.g., telephone call or a mobile application using voice-based communication (e.g., Alexa™ or Siri™).

In block 1018, the method 1000 includes transmitting, to the user device, a message via the selected messaging channel (e.g., SMS messaging channel, mobile application messaging channel, email messaging channel, web-based messaging channel, an AI chatbot phone call and an AI chatbot mobile application voice communication, etc.). The dialogue management system 122 may in conjunction with the NLP system 124 generate a message (e.g., a welcome message discussed above and/or answer to the servicing intent).

Figure 11:
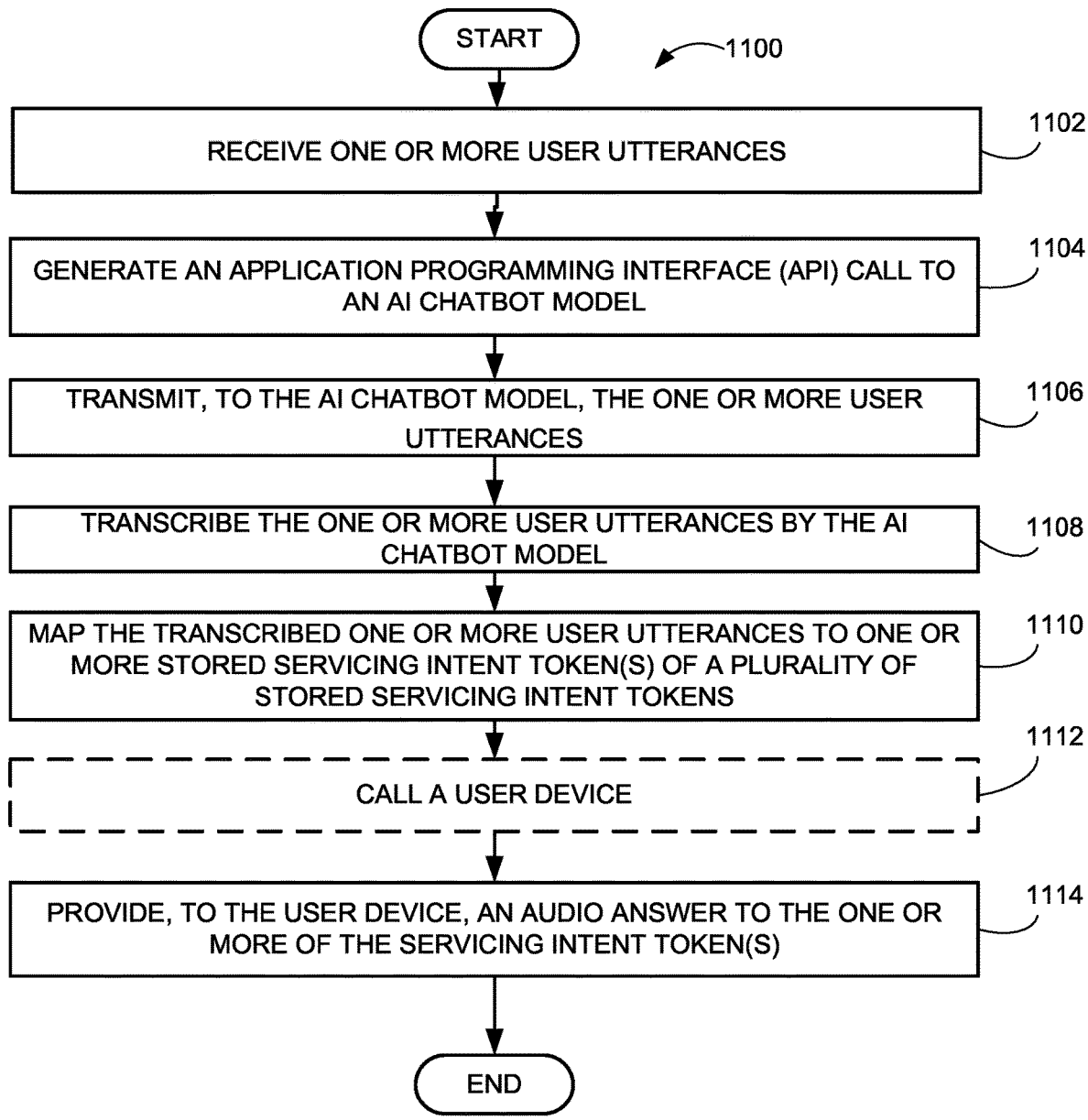
FIG. 11 is a flowchart of a method 1100 for transitioning a user from telephony or in-person servicing to a voice-based AI chat session.

FIG. 11 is a flowchart of a method 1100 for transitioning a user from a telephony or in person servicing to a voice-based AI chat session. In certain example implementations, one or more of the steps of the method 1100 may be performed by dialogue management system 122 using processor 202 to execute memory 206 or the NLP system 124. In some embodiments, steps of method 900 may be delegated to other components, such as the user device 102, and/or components associated with the system 100. Following method 1100, the system 100 may transmit a message to output by or for display by, for example, user device 102.

In block 1102, the method 1100 includes receiving one or more user utterances associated with a user. The dialogue management system 122 may receive one or more user utterances from a recording via a first phone call, a user interaction device 140, a customer interaction device 150.

In block 1104, the method 1100 includes generating an API call to an AI chatbot model. Blocks 416, 506, 610, 710, 812, 906, and 1004 are similar to block 1104, thus blocks 416, 506, 610, 710, 812, 906, and 1004 descriptions are incorporated by reference herein.

In block 1106, the method 1100 includes transmitting the one or more user utterances to the AI chatbot model. The dialogue management system 122 may transmit/transfer the one or more user utterances to the AI chatbot model (CBM 218) and the NLP system 124.

In block 1108, the method 1100 includes transcribing the one or more user utterances to a servicing intent by the AI chatbot model. The NLP system 124 with the AI chatbot model (CBM 218) may transcribe the one or more user utterances.

In block 1110, the method 1100 includes mapping the transcribed one or more user utterances to one or more servicing intent token(s) from a plurality of stored servicing intent tokens by the AI chatbot model as similarly described with respect to blocks 420, 512, and 1010.

In optional block 1112, the method 1100 may include calling a user device associated with the user associated with the one or more utterances. The method 1100 may not include this step when the user device is currently on a call with the dialogue management system 122 such as with an IVR model.

In block 1114, the method 1100 includes providing, to the user device, an audio answer to the one or more of the servicing intent token(s). In some embodiments, the dialogue management system 122 may communicate with the user device via a phone call, a mobile application call feature, or any other audio/voice messaging feature of the mobile application. As an example, the answer may be providing the user with the user's account balance if the user requested their account balance. Other answers may be recent transactions of the user, a confirmation that a bank card will be mailed, an explanation on why the recent transaction was declined, or combinations thereof.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements of the various embodiments included within the scope of the appended claims. For example, it is to be understood that features of one embodiment may not be exclusive to that embodiment and may be included with other embodiments. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following example use cases are intended solely for explanatory purposes, without limiting the scope of the disclosed technology.

In an example use case, a customer may have a question or request associated with an account they have with an organization. For example, the customer may want to know information related their account, such as the account balance, due date for payment, specifics about a purchase, etc. In some instances, the customer may want to perform an action related to their account, such as making a payment, dispute a charge, etc., and may further wish to have a convenient and efficient way to pose his or her question or request account service without having to deal with the waiting times. Depending on the type of desired action and customer preferences, the customer may be transitioned to, for example, using text-based messaging as a form of communication for posing questions or requesting service associated with their account.

To access the system 100, a user (e.g., the customer) using user device 102 may call a phone number associated with the system 100 (e.g., the dialogue management system 122 of the system 100) so that the dialogue management system 122 receives a phone call from the user device 102. In turn, the dialogue management system 122 may ask the user for personally identifiable information such as the user's first name, last name, and date of birth over the phone call. The dialogue management system 122 may also inquire as to which account (e.g., bank account, credit card account, loan account) the user is calling about. As the user answers these inquiries, the dialogue management system 122 receives personally identifiable information from the user over the phone call. The dialogue management system 122 may then authenticate the personally identifiable information by comparing the received personally identifiable information to stored personally identifiable information associated with the user. If the received personally identifiable information matches (e.g., beyond a predetermined 95% confidence threshold to account for "85" being provided as the year in the birth date in lieu of "1985," for example) stored personally identifiable information, then the dialogue management system 122 (or some other part of the system 100) authenticates the personally identifiable user. If, however, the received personally identifiable information does not match the stored personally identifiable information (e.g., beyond the predetermined 95% confidence threshold because the user's name fully matches a stored name but the provided birth date is a different month than the stored birth date), the dialogue management system 122 may request for additional personally identifiable information or direct the user of user device 102 to register (e.g., as a new user) with the dialogue management system 122 online or via a mobile application. Alternatively, if the received personally identifiable information does not match any stored personally identifiable information the dialogue management system 122 may, request to update some personally identifiable information, which may frequently arise if a current address is requested. After authenticating the user, the dialogue management system 122 may generate an authentication token in response to authenticating the personally identifiable information.

The user may speak into the user device 102 to explain the reason for calling (e.g., the user is requesting an account balance of their savings account) such that the dialogue management system 122 may identify the servicing intent of the user's request. Alternatively, the dialogue management system 122 may provide the user with a touch tone menu (e.g., via the user device 102) or voice menu (e.g., via the user device 102) of options that it is prepared to help with. For example, the touch tone menu might state "Press or say '1' for balance requests. Press '2' to receive your most recent transactions." Then, when the user presses the number 1 on their user device 102 that corresponds with their desired servicing intent. For example, the user might press number 1 corresponding to requesting a balance.

The dialogue management system 122 may generate a serving intent token based on the received serving intent. The dialogue management system 122 may generate an application programming interface (API) call to an AI chatbot model (e.g., CBM 218) associated with the identified communication channel. The dialogue management system 122 may transmit, to the AI chatbot model, the authentication token and the servicing intent token.

The dialogue management system 122 may map the servicing intent token to a stored servicing intent from a plurality of stored servicing intents. For example, the dialogue management system 122 may match the servicing intent token to the one stored servicing intent of the plurality of stored servicing intents stored in customer information database 216 or database 128. The dialogue management system 122 may transmitting a welcome message via an AI chat session, which may optionally identify the user, confirm that the user has been authenticated, and/or reflect the service intent, to the user device 102 via the chat session. The welcome message may simply be "Welcome to your chat session" in some embodiments. In other embodiments, the welcome message may state, "Welcome, John Smith! This chat session will provide your account balance for Account No. 1234 per your request. You have been previously authenticated." Alternatively, the dialogue management system 122 may send an authentication message to the user device 102 separately from the welcome message, show at least a portion of the interface screen or text in a color (e.g., green for authenticated, blue for non-authenticated), or include an icon or symbol (e.g., green check mark next to "John Smith") in lieu of an authentication message. Additionally, the dialogue management system 122 may transmit a voice message to the user device 102, via the phone call using IVR model 220, indicating that the AI chat session is available to ensure that the user is aware of the welcome message. Thus, the system 100 may seamlessly transition the customer service session in the IVR call over to an AI chatbot session, and the AI chatbot model may continue the AI chatbot session from that point without having to circle back to information already provided to the IVR model.

In another example use case, a user using user device 102 may call a phone number associated with the system 100 (e.g., the dialogue management system 122) so that the dialogue management system 122 receives a phone call from the user device 102. The dialogue management system 122 may receive one or more user utterances. For example, the one or more utterance may be "I would like to obtain an account balance of my savings account." The dialogue management system 122 may transcribe the one or more utterances to text. The dialogue management system 122 may generate an API call to an AI chatbot model (e.g., CBM 218). In lieu of or in addition to generating tokens in the prior example, the dialogue management system 122 may transmit, to the AI chatbot model, at least one of the one or more user utterances (e.g., all may be provided or a filtered subset ignoring "hello" or other utterances that do not convey customer information related to authentication or the first customer request). The dialogue management system 122 may convert the transcribed one or more user utterances to a servicing intent recognizable by the AI chatbot model. The dialogue management system 122 may transmits a message to the user device 102 via an AI chat session. In some use cases, the dialogue management system 122 may transmit, to the user device 102, via the phone call, a voice message indicating that the AI chat session is available. Thus, the system 100 may seamlessly transition the customer service session in the IVR call over to an AI chatbot session, and the AI chatbot model may continue the AI chatbot session from that point without having to circle back to information already provided to the IVR model.

In another example use case, a user using user device 102 may call a phone number associated with the system 100 (e.g., dialogue management system 122) so that the dialogue management system 122 receives a phone call from the user device 102. The dialogue management system 122 may receive a touch tone phone input or a user utterance or both. In response, the dialogue management system 122 may determine that the touch tone phone input or the user utterance corresponds to a first servicing intent. For example, the dialogue management system 122 may map the touch tone phone input selected menu option (e.g., press 1 for account balance) to a stored servicing intent of the plurality of stored servicing intents. Alternatively, the dialogue management system 122 may map the user utterance to a stored servicing intent of the plurality of stored servicing intents (which may be generic to all models or specific to a particular model).

The dialogue management system 122 may generate a first servicing intent token based on the first servicing intent. The dialogue management system 122 may generate an API call to an AI chatbot and transmit, to the AI chatbot model, the first servicing intent token. The dialogue management system 122 may transmit an SMS message, a mobile application notification, a mobile application message, an email message, or combinations thereof. In some use cases, the dialogue management system 122 may transmit, to the user device via the first phone call, a first voice notification that the AI chat session is available. The dialogue management system 122 may transmit, to the user device 102 via the AI chat session, a first answer responding to the first servicing intent. The dialogue management system 122 may receive from the user device 102 via the AI chat session, a first user message comprising a second servicing intent and a second user message comprising a request to be transferred to the IVR model 220. In turn, the dialogue management system 122 may transmit the first user message to the IVR model 220. The dialogue management system 122 may determine whether the first phone call is active. If it is, then the dialogue management system 122 may transmit a system message that the IVR model is available to the user device 102 via the AI chat session. If not, then the dialogue management system 122 may initiate, via the IVR model 220, a second phone call with the user device. The dialogue management system 122 may transmit, via the first phone call or the second phone call, a second answer responding to the second servicing intent. For example, the second servicing intent may be a request for the three most recent transactions made for a checking account. Thus, the dialogue management system 122 may vocally provide the three most recent transactions over the first or second phone call. In this way, the dialogue management system can seamlessly transition the user from an IVR model to a text-based model (AI chatbot model) and back to an IVR model in response to a user request (e.g., the user starts on the phone, finds it easier to receive information associated with a first request via text, and then hops in his car and needs to switch back to the phone without suffering the inconvenience of starting an entirely new chat after each transition). Each model is provided with the prior messages and servicing intents so that the user does not have to repeat himself when the user changes from the voice-based IVR model 220 to the text-based model 218 (AI chatbot model).

What is claimed is:

1. A system for transitioning in-person servicing to an artificial intelligence (AI) chat session, the system comprising:
   one or more processors; and
   a memory in communication with the one or more processors and storing instructions that, when executed by the one or more processors, are configured to cause the system to:
   receive, from a first user device, authentication input data;
   generate an authentication token based on the authentication input data;
   receive, from the first user device, servicing intent input data;
   generate a servicing intent token based on the servicing intent input data;
   generate an application programming interface (API) call to an AI chatbot model;
   transmit, to the AI chatbot model, the authentication token and the servicing intent token;
   map, via the AI chatbot model, the servicing intent token to a stored servicing intent token from a plurality of stored servicing intent tokens; and
   transmit a message to a second user device via the AI chat session.

2. The system of claim 1, wherein the message is communicated via one or more messaging channels comprising a short message service (SMS) message channel, a mobile application notification channel, a voice message channel, and an email message channel.

3. The system of claim 2, further comprising instructions that, when executed by the one or more processors, are configured to cause the system to:
   select the one or more messaging channels based on one or more stored implicit preferences, one or more explicit preferences, predictive machine learning, type of information being provided, or combinations thereof.

4. The system of claim 3, wherein selecting the one or more messaging channels is based on predictive machine learning for determining one or more implicit preferences of a user based on a history of interactions with the user.

5. The system of claim 3, further comprising instructions that, when executed by the one or more processors, are configured to cause the system to:
   receive the one or more explicit preferences; and
   responsive to receiving the one or more explicit preferences, select the one or more messaging channels based on the one or more explicit preferences by overriding the one or more stored implicit preferences.

6. The system of claim 3, further comprising instructions that, when executed by the one or more processors, are configured to cause the system to:
   determine whether the one or more stored implicit preferences or the one or more explicit preferences exist; and
   responsive to determining neither the one or more stored implicit preferences nor the one or more explicit preferences exist, select the SMS message channel as a default channel.

7. The system of claim 2, further comprising instructions that, when executed by the one or more processors, are configured to cause the system to:
   receive a messaging channel selection from the second user device, the messaging channel selection indicative of a user preference for one or more messaging channels of the SMS message channel, the mobile application notification channel, and the email message channel.

8. The system of claim 2, further comprising instructions that, when executed by the one or more processors, are configured to cause the system to:
   transmit, via the AI chat session, an answer to the second user device based on the servicing intent input data; and
   store text-based interaction comprising the answer.

9. The system of claim 8, wherein:
   the servicing intent input data comprises a request for an account balance, a request for recent transactions, a request to update an email address of a user, a request for a bank card, a request for why a recent transaction was declined, or combinations thereof, and
   the answer comprises an account balance of the user, recent transactions of the user, a prompt to the user to type an email address of the user in the AI chat session, a confirmation that a bank card will be mailed, an explanation on why the recent transaction was declined, or combinations thereof.

10. The system of claim 8, wherein the answer comprises a deep link that allows the second user device to perform an action in a mobile application or a web browser based on the servicing intent input data and without additional authentication.

11. The system of claim 1, wherein receiving, from the first user device, the servicing intent input data comprises (i) receiving an option selected from a touch tone menu or (ii)

receiving a user utterance and determining the servicing intent input data from the user utterance.

12. A system comprising:
one or more processors; and
a memory in communication with the one or more processors and storing instructions that, when executed by the one or more processors, are configured to cause the system to:
receive, from a user device, personally identifiable information;
authenticate the personally identifiable information;
generate an authentication token;
receive, from the user device, a servicing intent;
generate a servicing intent token;
generate an application programming interface (API) call to an artificial intelligence (AI) chatbot model;
transmit, to the AI chatbot model, the authentication token and the servicing intent token;
map, via the AI chatbot model, the servicing intent token to a stored servicing intent token from a plurality of stored servicing intent tokens; and
transmit a message to a second user device via an AI chat session.

13. The system of claim 12, wherein the message is communicated via one or more messaging channels comprising a short message service (SMS) message channel, a mobile application notification channel, and an email message channel.

14. The system of claim 13, further comprising instructions that, when executed by the one or more processors, are configured to cause the system to:
select the one or more messaging channels based on one or more stored implicit preferences, one or more explicit preferences, predictive machine learning, or combinations thereof.

15. The system of claim 14, further comprising instructions that, when executed by the one or more processors, are configured to cause the system to:
receive the one or more explicit preferences; and
responsive to receiving the one or more explicit preferences, select the one or more messaging channels based on the one or more explicit preferences by overriding the one or more stored implicit preferences.

16. The system of claim 14, further comprising instructions that, when executed by the one or more processors, are configured to cause the system to:
determine whether the one or more stored implicit preferences or the one or more explicit preferences exist; and
responsive to determining neither the one or more stored implicit preferences nor the one or more explicit preferences exist, select the SMS message channel as a default channel.

17. The system of claim 12, further comprising instructions that, when executed by the one or more processors, are configured to cause the system to:
transmit, via the AI chat session, an answer to the second user device based on the servicing intent; and
store text-based interaction comprising the answer.

18. The system of claim 12, further comprising instructions that, when executed by the one or more processors, are configured to cause the system to:
compare the received personally identifiable information to stored personally identifiable information associated with a user of the second user device, wherein authenticating the personally identifiable information comprises determining the received personally identifiable information matches the stored personally identifiable information based on a predetermined confidence threshold.

19. The system of claim 18, further comprising instructions that, when executed by the one or more processors, are configured to cause the system to:
prompt the user for additional personally identifiable information when the received personally identifiable information does not match the stored personally identifiable information based on the predetermined confidence threshold.

20. A system, comprising:
one or more processors; and
a memory in communication with the one or more processors and storing instructions that, when executed by the one or more processors, are configured to cause the system to:
receive, from a first user device, first personally identifiable information associated with a user;
compare the received first personally identifiable information with stored personally identifiable information associated with the user;
determine the received first personally identifiable information does not match the stored personally identifiable information based on a predetermined matching confidence threshold;
prompt the user for second personally identifiable information associated with the user;
determine the second personally identifiable information matches the stored personally identifiable information based on the predetermined matching confidence threshold;
authenticate the second personally identifiable information;
generate an authentication token;
receive, from the first user device, a first servicing intent;
generate a first servicing intent token;
generate an application programming interface (API) call to an artificial intelligence (AI) chatbot model;
transmit, to the AI chatbot model, the authentication token and the first servicing intent token;
transmit a short message service (SMS) message, a mobile application notification, an email message, or combinations thereof to the second user device via an AI chat session;
transmit, to the second user device via the AI chat session, a first answer responding to the first servicing intent;
receive, from the second user device via the AI chat session, a first user message comprising a second servicing intent; and
transmit, to the second user device via the AI chat session, a second answer responding to the second servicing intent.

* * * * *